US012681428B2

(12) United States Patent
Maeda et al.

(10) Patent No.: US 12,681,428 B2
(45) Date of Patent: Jul. 14, 2026

(54) PROCESS UNIT AND RECEPTION UNIT

(71) Applicant: CANON KABUSHIKI KAISHA, Tokyo (JP)

(72) Inventors: Naoki Maeda, Shizuoka (JP); Makoto Hayashida, Shizuoka (JP); Fumito Nonaka, Shizuoka (JP); Joji Goto, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 18/911,879

(22) Filed: Oct. 10, 2024

(65) Prior Publication Data

US 2025/0123590 A1 Apr. 17, 2025

(30) Foreign Application Priority Data

Oct. 13, 2023 (JP) ................................ 2023-177180

(51) Int. Cl.
*G03G 21/18* (2006.01)
*G03G 15/08* (2006.01)
*G03G 21/10* (2006.01)
*G03G 21/12* (2006.01)

(52) U.S. Cl.
CPC ..... *G03G 21/1832* (2013.01); *G03G 15/0886* (2013.01); *G03G 21/105* (2013.01); *G03G 21/12* (2013.01); *G03G 21/1814* (2013.01)

(58) Field of Classification Search
CPC ........... G03G 15/0865; G03G 15/0868; G03G 15/0886; G03G 21/10; G03G 21/105; G03G 21/12; G03G 21/1814; G03G 21/1832
See application file for complete search history.

(56) References Cited

U.S. PATENT DOCUMENTS

2020/0064773 A1* 2/2020 Sato ......................... G03G 1/10
2023/0418208 A1* 12/2023 Hayashida ......... G03G 21/1814
2025/0004393 A1* 1/2025 Goto .................. G03G 15/0875

FOREIGN PATENT DOCUMENTS

JP H09138576 A 5/1997
JP 2012047785 A 3/2012

* cited by examiner

*Primary Examiner* — Sophia S Chen
(74) *Attorney, Agent, or Firm* — Canon U.S.A., Inc. IP Division

(57) ABSTRACT

A process unit includes a supply unit including a discharge port through which toner is discharged and having a discharge surface around the discharge port, and a reception unit that receives toner from the supply unit. The reception unit includes a reception frame including a reception port for receiving toner from the discharge port, and a reception seal member having a reception seal opening that communicates with the reception port, and a facing surface facing the discharge surface. In a case where the facing surface moves relative to the discharge surface while being in contact with the discharge surface in a state in which the toner exists between the facing surface and the discharge surface, the toner and the discharge surface are charged to a same side polarity relative to a polarity of the facing surface.

18 Claims, 28 Drawing Sheets

PROCESS UNIT AND RECEPTION UNIT

BACKGROUND

Field

The present disclosure relates to a process unit to be used in an electrophotographic image forming apparatus, and a reception unit to be used in a process unit. Examples of the electrophotographic image forming apparatus include an electrophotographic copier, an electrophotographic printer (light-emitting diode (LED) printer, a laser beam printer, etc.), a facsimile apparatus, and a word processor.

Description of the Related Art

Conventionally, there has been known a configuration in which toner is supplied to a development unit, such as a development roller, from a toner cartridge storing toner. Japanese Patent Application Laid-Open No. H9-138576 discusses that a toner cartridge is attached to a housing of a development device of an image forming apparatus.

SUMMARY

The present disclosure is directed to further development of the conventional technique.

According to aspects of the disclosure of the subject application, the following are provided.

According to an aspect of the present disclosure, a process unit includes a supply unit including a discharge port through which toner is discharged and having a discharge surface arranged around the discharge port, and a reception unit configured to receive toner from the supply unit and including (i) a reception frame including a reception port through which toner discharged from the discharge port is received, and (ii) a reception seal member having a reception seal opening that communicates with the reception port, and a facing surface facing the discharge surface, wherein the reception unit is movable relative to the supply unit in such a manner that the facing surface moves relative to the discharge surface while being in contact with the discharge surface, and wherein, in a case where the facing surface moves relative to the discharge surface while being in contact with the discharge surface in a state in which the toner exists between the facing surface and the discharge surface, the toner and the discharge surface are charged to a same side polarity relative to a polarity of the facing surface.

According to another aspect of the present disclosure, a reception unit configured to receive toner from a supply unit, which includes a discharge port through which toner is discharged and has a discharge surface arranged around the discharge port, includes a reception frame including a reception port through which toner discharged from the discharge port is received, and a reception seal member having a reception seal opening that communicates with the reception port, and a facing surface facing the discharge surface, wherein the reception unit is movable relative to the supply unit in such a manner that the facing surface moves relative to the discharge surface while being in contact with the discharge surface, and wherein, in a case where the facing surface moves relative to the discharge surface while being in contact with the discharge surface in a state in which the toner exists between the facing surface and the discharge surface, the toner and the discharge surface are charged to a same side polarity relative to a polarity of the facing surface.

Further features of the present disclosure will become apparent from the following description of exemplary embodiments with reference to the attached drawings.

DESCRIPTION OF THE EMBODIMENTS

Hereinafter, exemplary embodiments of the present disclosure will be described in detail.

The dimensions, materials, and shapes of the components to be described in the following exemplary embodiment, and their relative arrangement are to be appropriately changed depending on the configuration of an apparatus to which the present disclosure is applied, and various conditions. Accordingly, the scope of the present disclosure is not limited to them unless otherwise stated. In the following description, the ordinal numbers, such as first and second, are merely used for the sake of explanatory convenience, and can be switched appropriately as a general rule.

Laser Printer General Overview

A laser printer 1 serving as an example of an image forming apparatus according to a first exemplary embodiment will be described with reference to FIGS. 1, 2, 3, 4, and 5.

Figure 1:
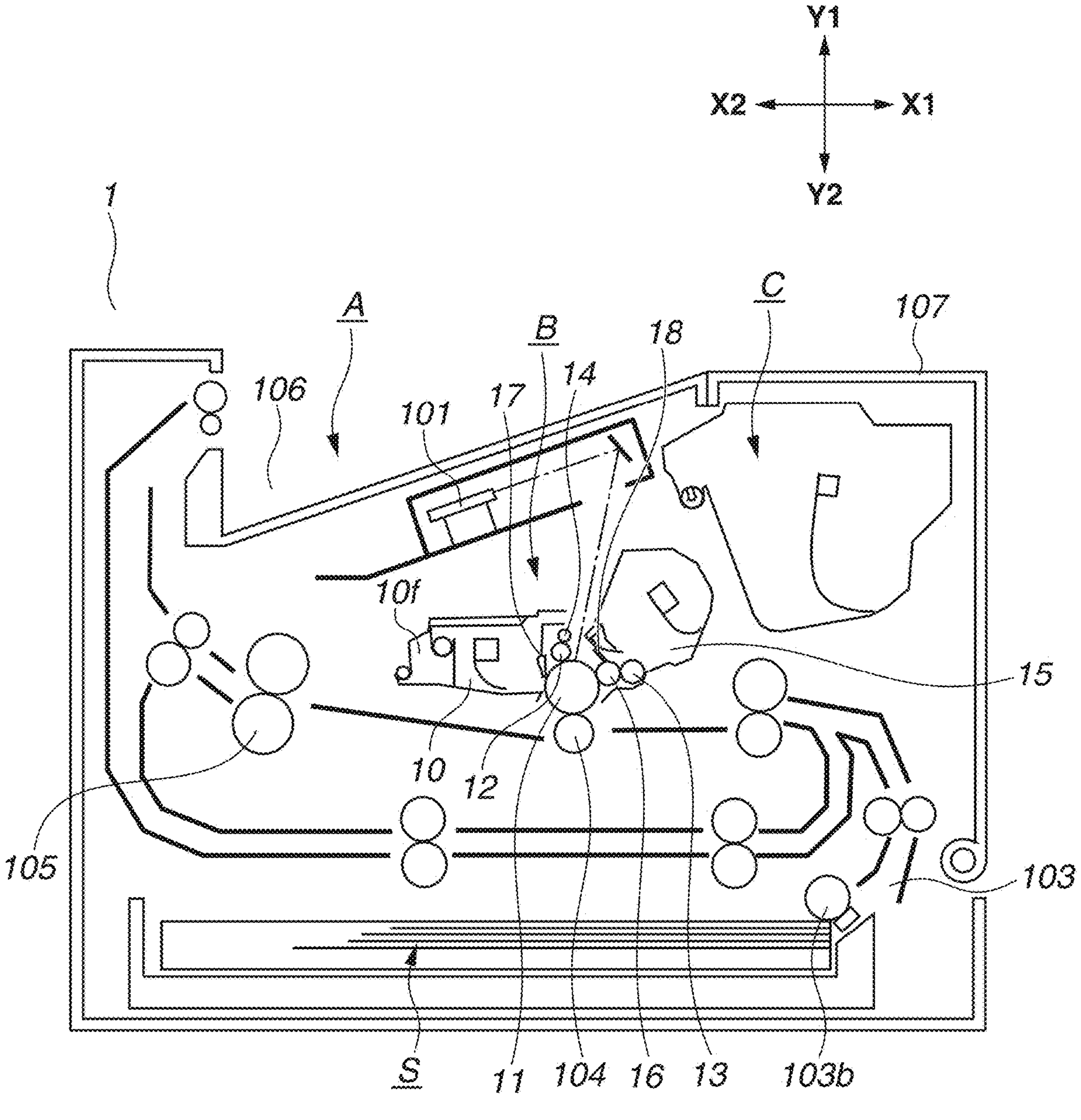
FIG. 1 is a diagram illustrating a schematic configuration of a laser printer.

FIG. 1 is a diagram illustrating a schematic configuration of the laser printer 1. As illustrated in FIG. 1, the laser printer 1 includes a printer main body A, a process cartridge (process unit) B, and a toner cartridge (supply cartridge, supply unit) C.

In the printer main body A, a sheet feeding unit 103, a transfer roller 104, a fixing unit 105, and a laser scanner 101 are installed. In addition, the process cartridge B and the toner cartridge C are attachable to and detachable from the printer main body A.

The process cartridge B will be described with reference to FIGS. 2, 3, 4, and 5.

Figure 2:
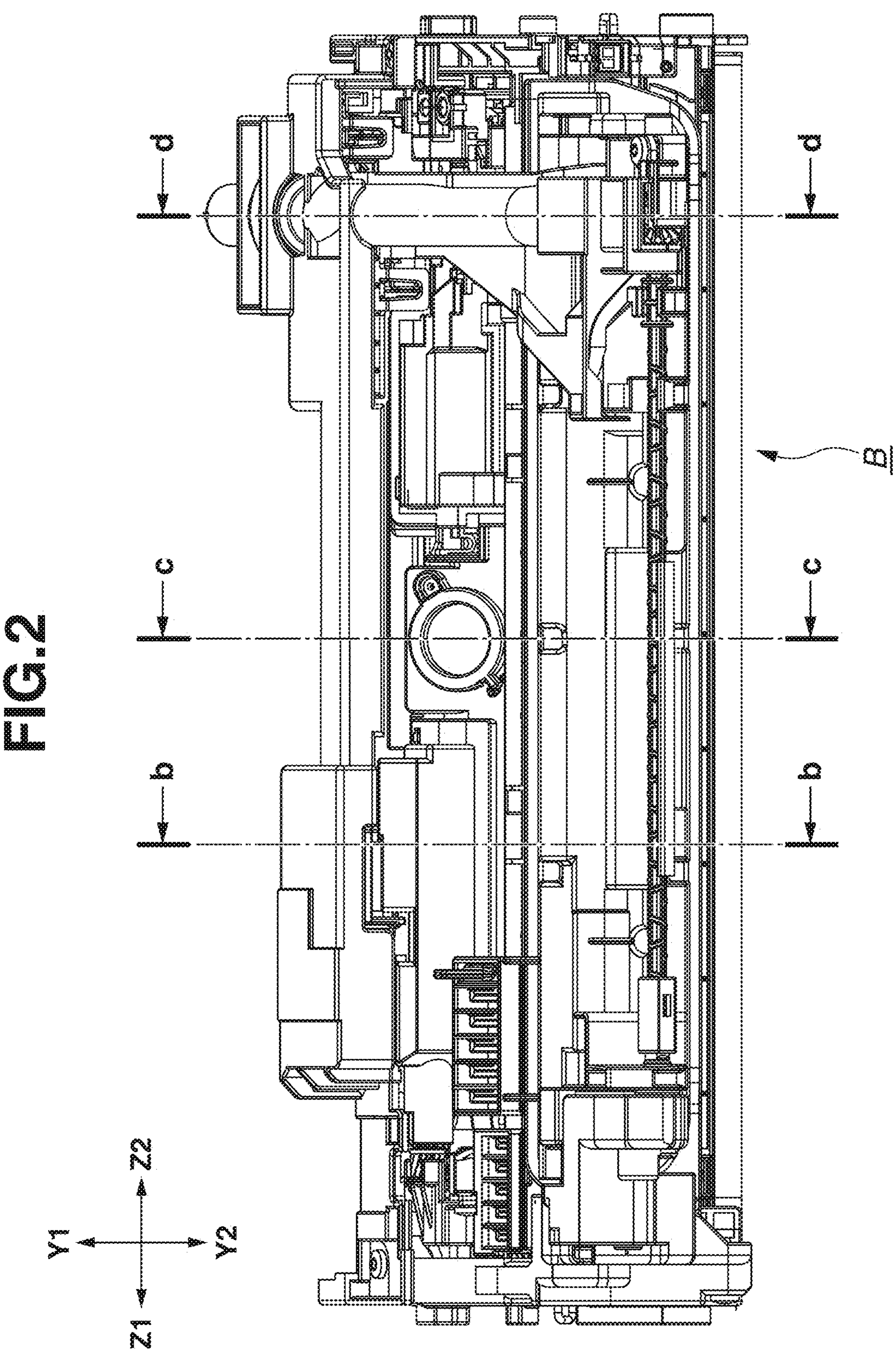
FIG. 2 is a front view of a process cartridge.
Figure 3:
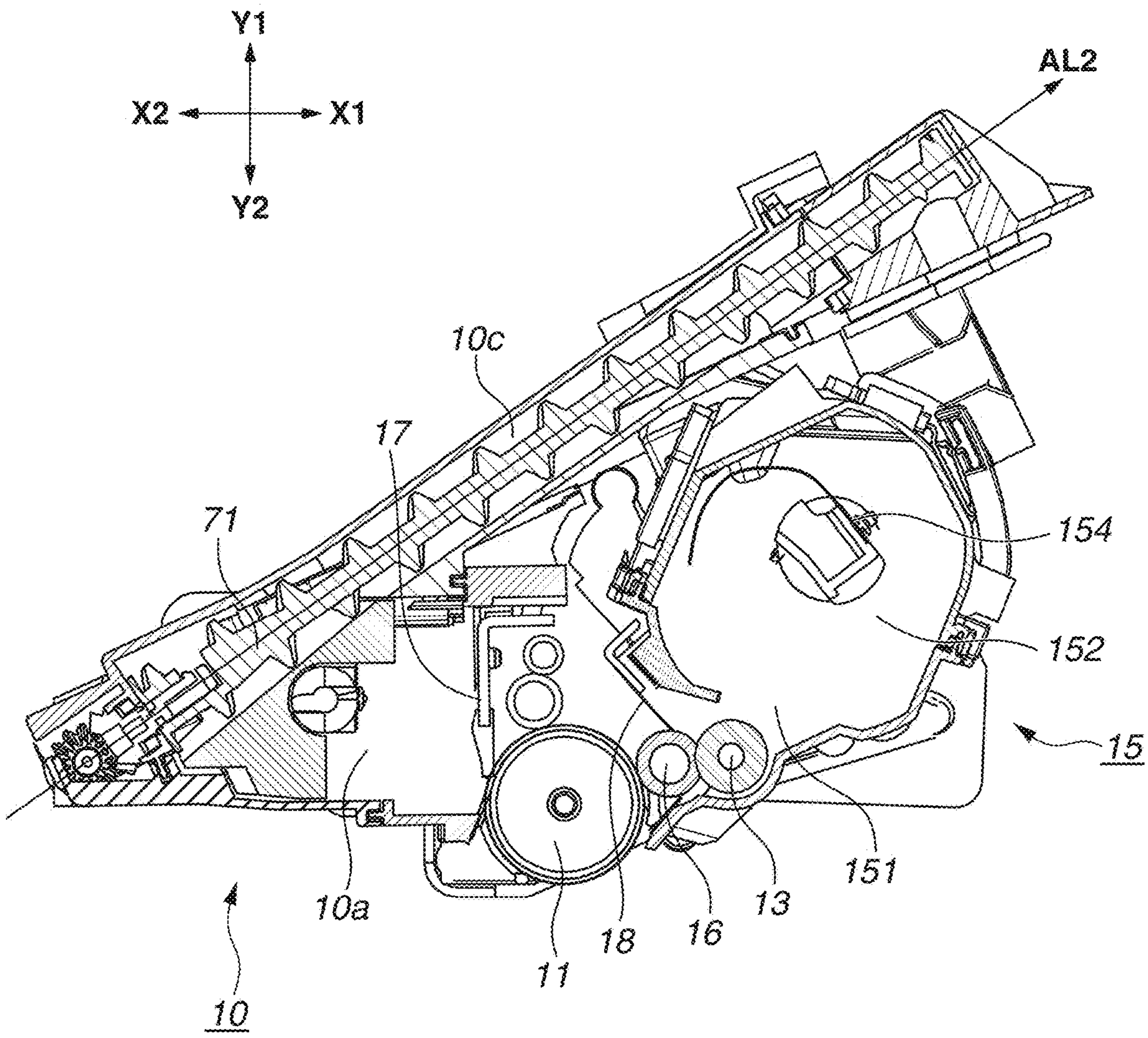
FIG. 3 is a cross-sectional view of a process cartridge.
Figure 4:
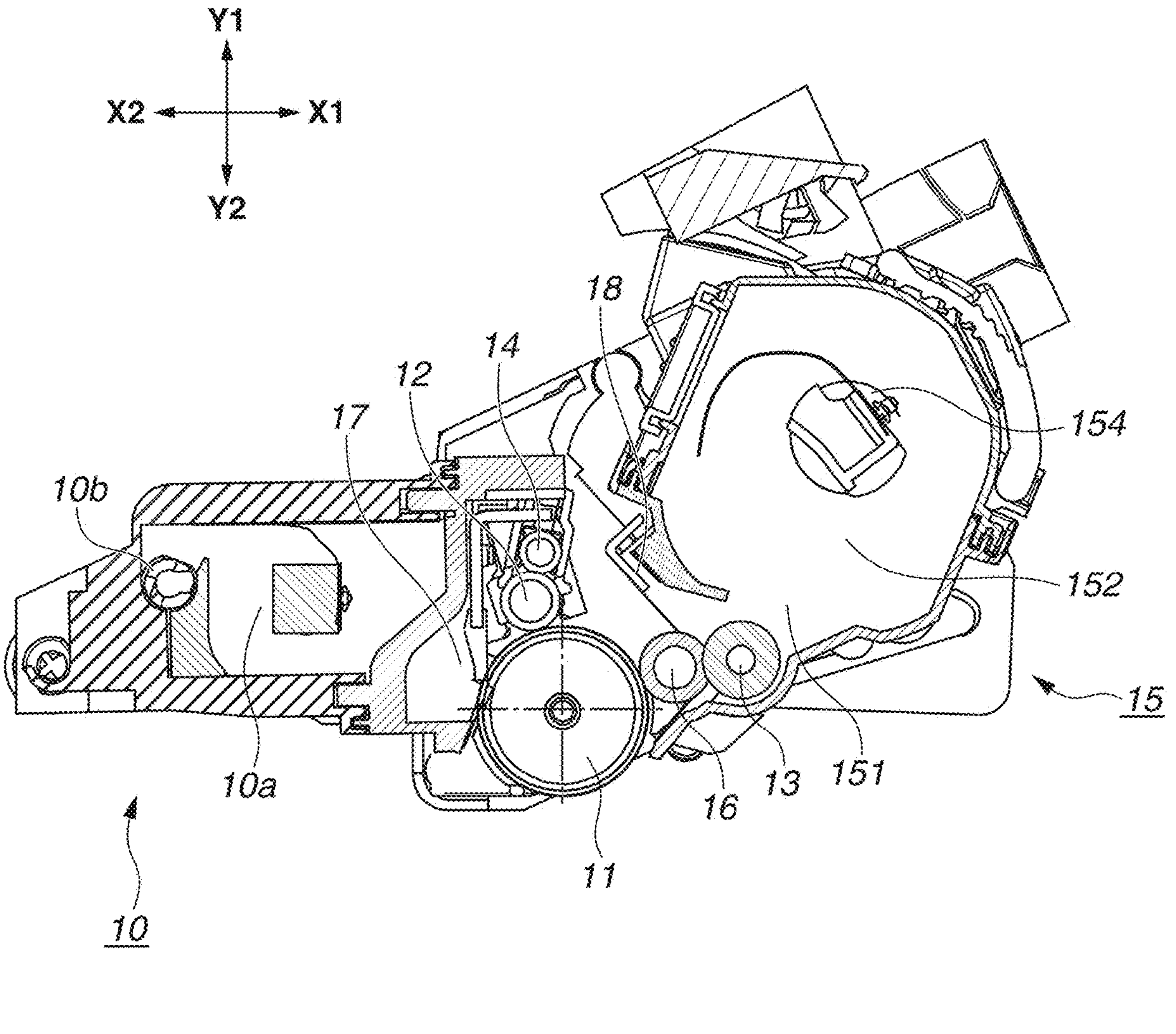
FIG. 4 is a cross-sectional view of the process cartridge.
Figure 5:
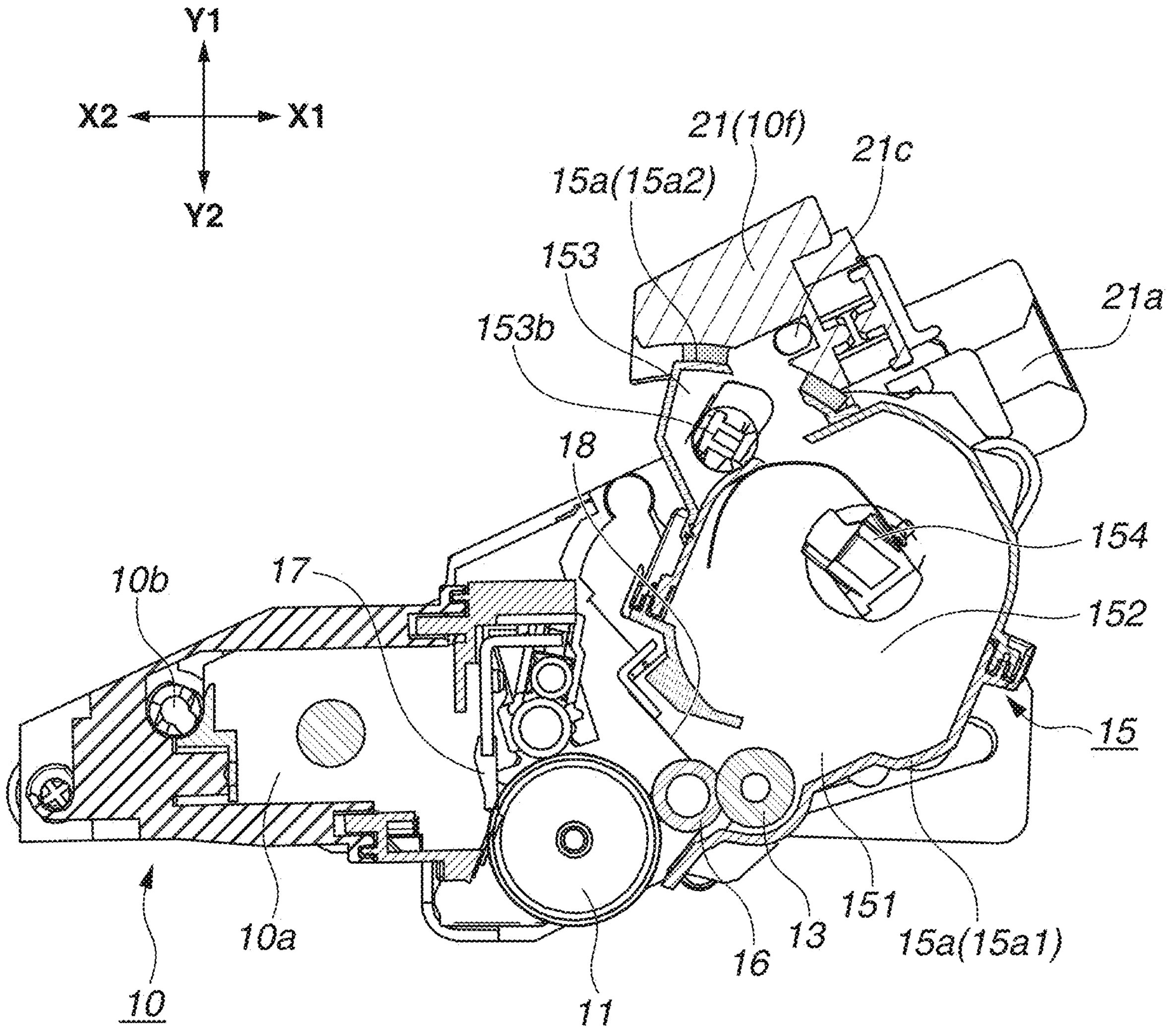
FIG. 5 is a cross-sectional view of the process cartridge.

FIG. 2 is a front view of the process cartridge B. More specifically, FIG. 2 is a front view illustrating the process cartridge B viewed in an X1 direction in FIG. 1. FIGS. 3, 4, and 5 are cross-sectional views of the process cartridge B. More specifically, FIG. 3 is a cross-sectional view of the process cartridge B taken along a d-d line in FIG. 2, FIG. 4 is a cross-sectional view of the process cartridge B taken along a c-c line in FIG. 2, and FIG. 5 is a cross-sectional view of the process cartridge B taken along a b-b line in FIG. 2.

As illustrated in FIGS. 3 and 4, the process cartridge B includes a photosensitive member unit 10 including a drum unit (photosensitive member, photosensitive drum) 11 serving as an image bearing member, and a development unit 15 including a development roller 16 serving as a development unit (developer bearing member) bearing toner. The development roller 16 is configured to develop an electrostatic latent image formed on the surface of the drum unit 11 using toner.

In the photosensitive member unit 10, the drum unit 11 is rotatably supported. The drum unit 11 is driven by the printer main body A. The photosensitive member unit 10 also includes a cleaning blade 17 serving as a cleaning member that cleans the drum unit 11, a charging roller 12 serving as a charging member, and a charging roller cleaner 14 serving as a cleaning member that cleans the charging roller 12. The photosensitive member unit 10 also includes a first waste toner chamber 10*a*, a first waste toner conveyance path 10*b*, and a second waste toner conveyance path 10*c*.

Hereinafter, a rotational axis direction of the drum unit 11 is set as a Z direction (arrow Z1, arrow Z2). As illustrated in FIG. 1, a horizontal direction is set as an X direction (arrow X1, arrow X2), and a vertical direction is set as a Y direction (arrow Y1, arrow Y2). The X direction, the Y direction, and the Z direction are orthogonal to each other.

The charging roller 12 is arranged in such a manner as to be in contact with the outer circumferential surface of the drum unit 11. By a voltage being applied to the charging roller 12 from the printer main body A, the charging roller 12 charges the drum unit 11. In addition, the charging roller 12 is configured to be rotated by the drum unit 11.

The cleaning blade 17 is an elastic member arranged in such a manner as to be in contact with the outer circumferential surface of the drum unit 11. The cleaning blade 17 removes, from the drum unit 11, toner remaining on the outer circumferential surface of the drum unit 11 after a sheet (recording material) S to be described below has passed between the drum unit 11 and the transfer roller 104. The removed toner (waste toner) is conveyed from the first waste toner chamber 10*a* to be described below, to the toner cartridge C through the first waste toner conveyance path 10*b* and the second waste toner conveyance path 10*c*.

The charging roller cleaner 14 is arranged in such a manner as to be in contact with the outer circumferential surface of the charging roller 12, and cleans the charging roller 12 while being rotated by the charging roller 12.

As illustrated in FIG. 5, the development unit 15 includes a development chamber 151 in which the development roller 16 is arranged, and a developer storage unit (developer storage chamber, storage chamber) 152 storing toner to be supplied to the development chamber 151. The development unit 15 also includes a toner reception unit 153 that receives toner supplied from the toner cartridge C. The toner supplied from the toner cartridge C is supplied to the developer storage unit 152 via a stay 21 to be described below and the toner reception unit 153.

The development roller 16 supplies toner to a development region of the drum unit 11. Then, the development roller 16 develops an electrostatic latent image formed on the drum unit 11 using toner.

A supply roller 13 supplies toner in the development chamber 151 to the development roller 16 and scrapes off excess toner adhering to the development roller 16 at the same time in a state of being in contact with the development roller 16.

A development blade 18 determines an amount of toner adhering to the circumferential surface of the development roller 16 in a state of being in contact with the circumferential surface of the development roller 16, and applies charges to toner by frictional charging.

The developer storage unit 152 stores toner to be supplied to the development roller 16. The toner stored in the developer storage unit 152 is fed to the development chamber 151 by the rotation of an agitation member 154 and then supplied to the development roller 16.

In the present exemplary embodiment, an amount of toner stored in the developer storage unit 152 is detected by a remaining amount detection unit (not illustrated). When the amount of toner stored in the developer storage unit 152 reaches a certain amount or less, toner is supplied from the toner cartridge C to the process cartridge B.

As illustrated in FIG. 5, the photosensitive member unit 10 includes the stay 21. The toner discharged from the toner cartridge C is supplied to the stay 21 of the photosensitive member unit 10. The toner supplied to the stay 21 is discharged toward the development unit 15. More specifically, the stay 21 includes a first reception port 21*c*. The toner discharged from the toner cartridge C is received through the first reception port 21*c*. The toner having passed through the first reception port 21*c* is discharged toward the development unit 15.

The toner supplied to the development unit 15 via the first reception port 21*c* of the stay 21 is supplied to the developer storage unit 152 through the toner reception unit 153.

The process cartridge B and the toner cartridge C are configured to be attached to and detached from the printer main body A, which will be described in detail below. The toner cartridge C is configured to be attached to and detached from the process cartridge B. More specifically, the toner cartridge C is configured to be attached to and detached from the photosensitive member unit 10 of the process cartridge B. The toner cartridge (supply cartridge, supply unit) C supplies toner to the process cartridge B.

Next, an operation of the laser printer 1 will be described with reference to FIG. 1.

The drum unit 11 rotationally driven by a drive source (not illustrated) is uniformly charged by the charging roller 12 to a predetermined potential. The surface of the charged drum unit 11 is exposed by the laser scanner 101 based on image information, and charges in the exposed portion are removed. An electrostatic latent image is accordingly formed on the surface of the drum unit 11. Toner is supplied from the development roller 16 to the electrostatic latent image on the drum unit 11, and the electrostatic latent image is visualized as a toner image.

On the other hand, a primary transfer portion is formed between the drum unit 11 and the transfer roller 104. The toner image formed on the surface of the drum unit 11 is conveyed to the primary transfer portion by the rotation of the drum unit 11.

On the other hand, the sheet S is conveyed by the sheet feeding unit 103 concurrently with the toner image formation operation described above. Specifically, Specifically, a feeding roller 103*b* rotates and feeds the sheet S. In synchronization with a timing at which the toner image formed on the drum unit 11 reaches the primary transfer portion, the sheet S is conveyed to the primary transfer portion.

A voltage is applied to the transfer roller 104 when the sheet S passes through the primary transfer portion, and the toner image is transferred onto the sheet S as an unfixed image. After that, the sheet S bearing the transferred toner image is conveyed to the fixing unit 105. The sheet S conveyed to the fixing unit 105 is heated and pressed when passing through the fixing unit 105, and the unfixed image is fixed onto the surface of the sheet S.

The sheet S is further conveyed by the sheet feeding unit 103, discharged to a discharge tray 106, and stacked on the discharge tray 106.

Process Cartridge

Figure 6B:
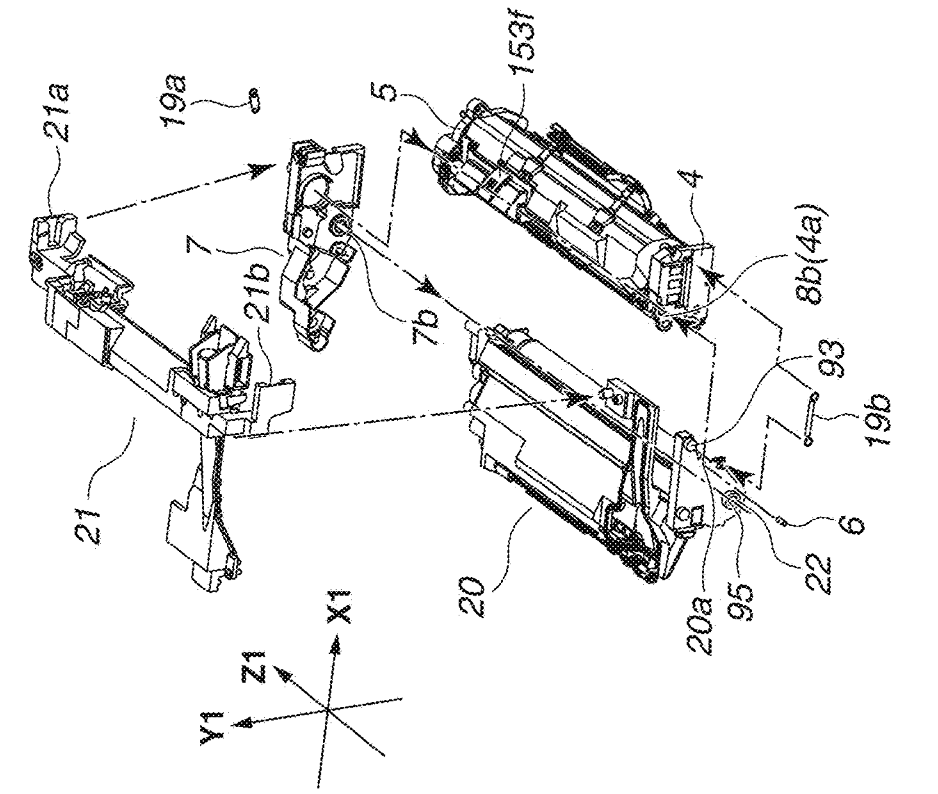
FIGS. 6A and 6B are exploded perspective views of the process cartridge.
Figure 6A:
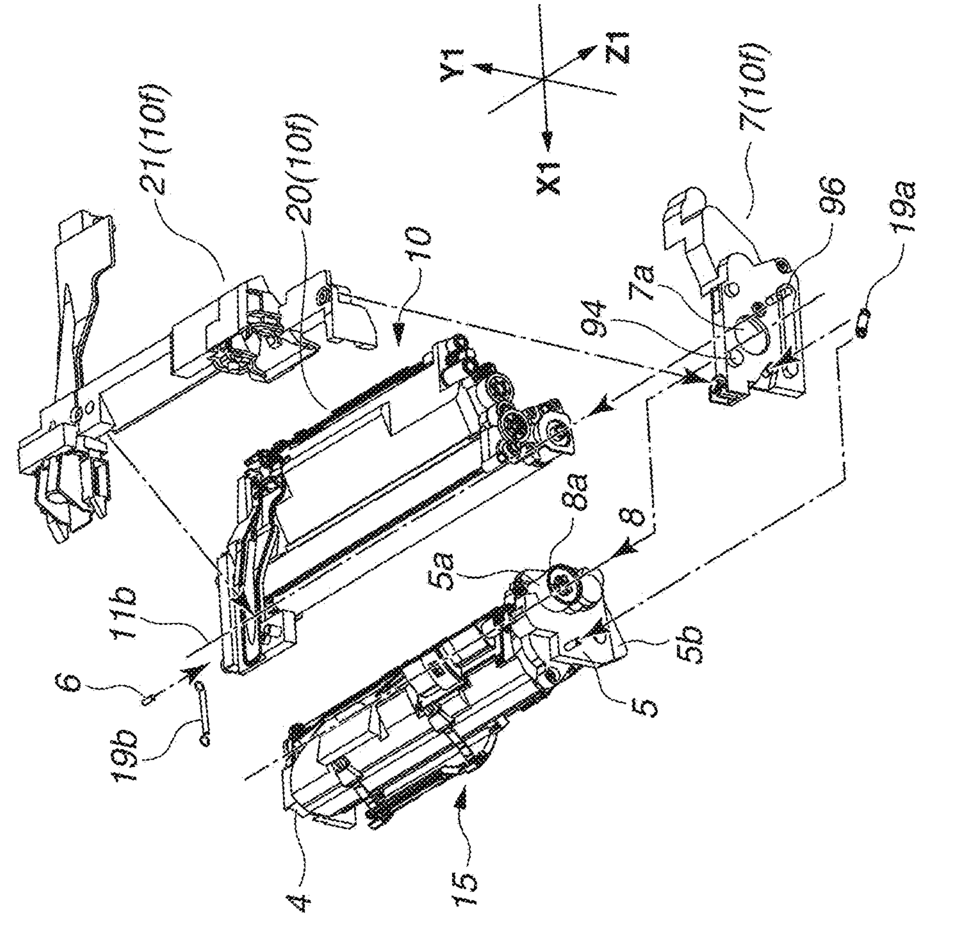
Figure 7B:
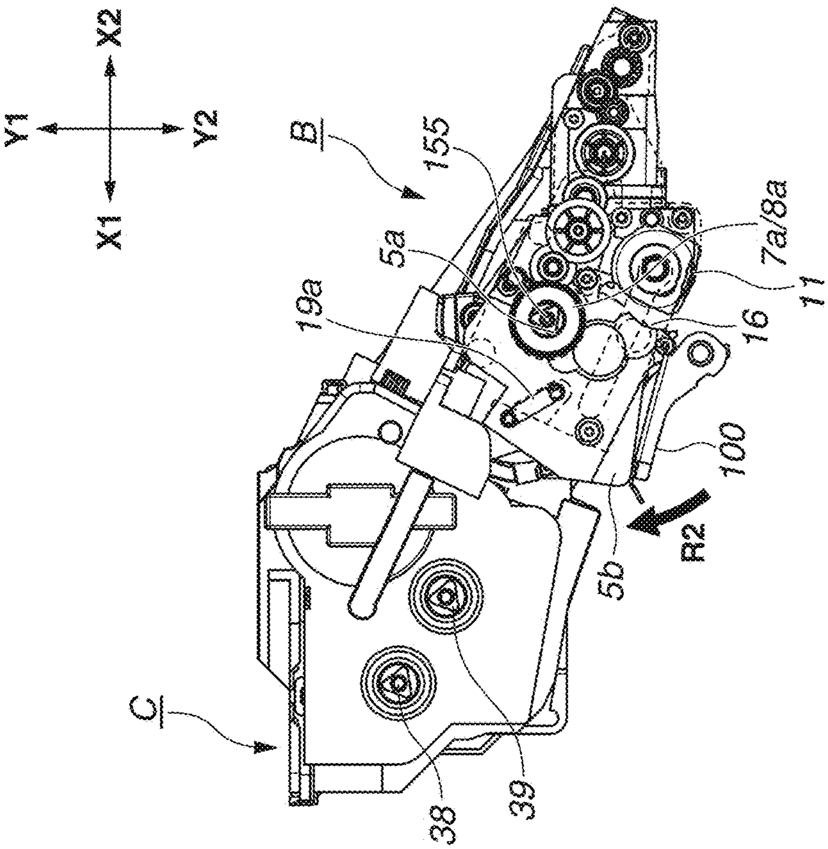
FIGS. 7A and 7B are side views illustrating the movement of a development unit relative to a drum unit.
Figure 7A:
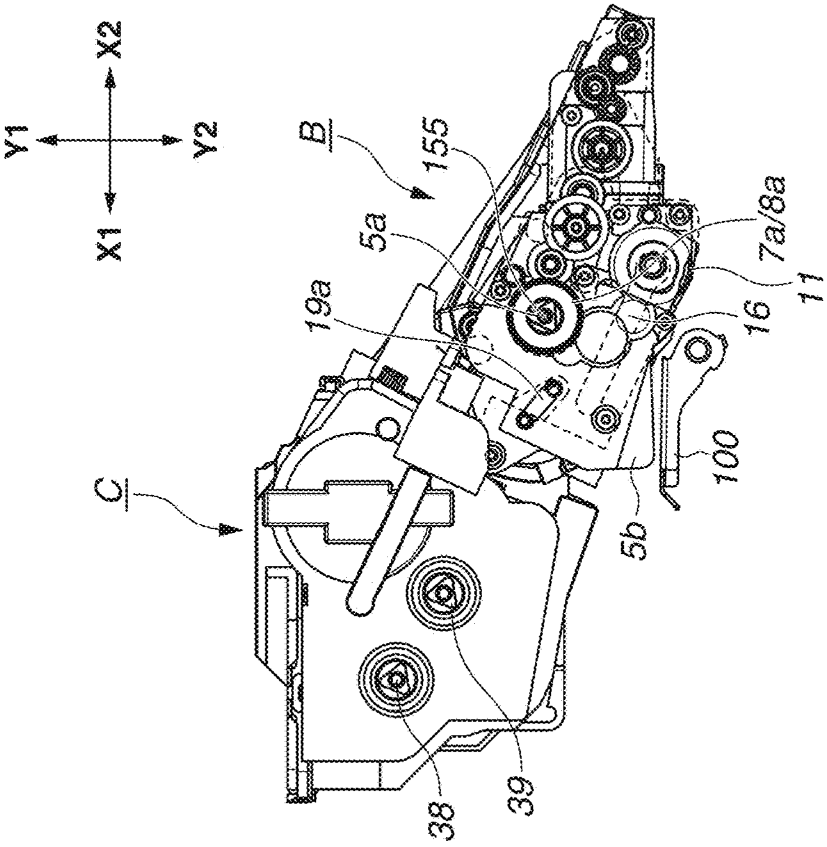
Figure 8:
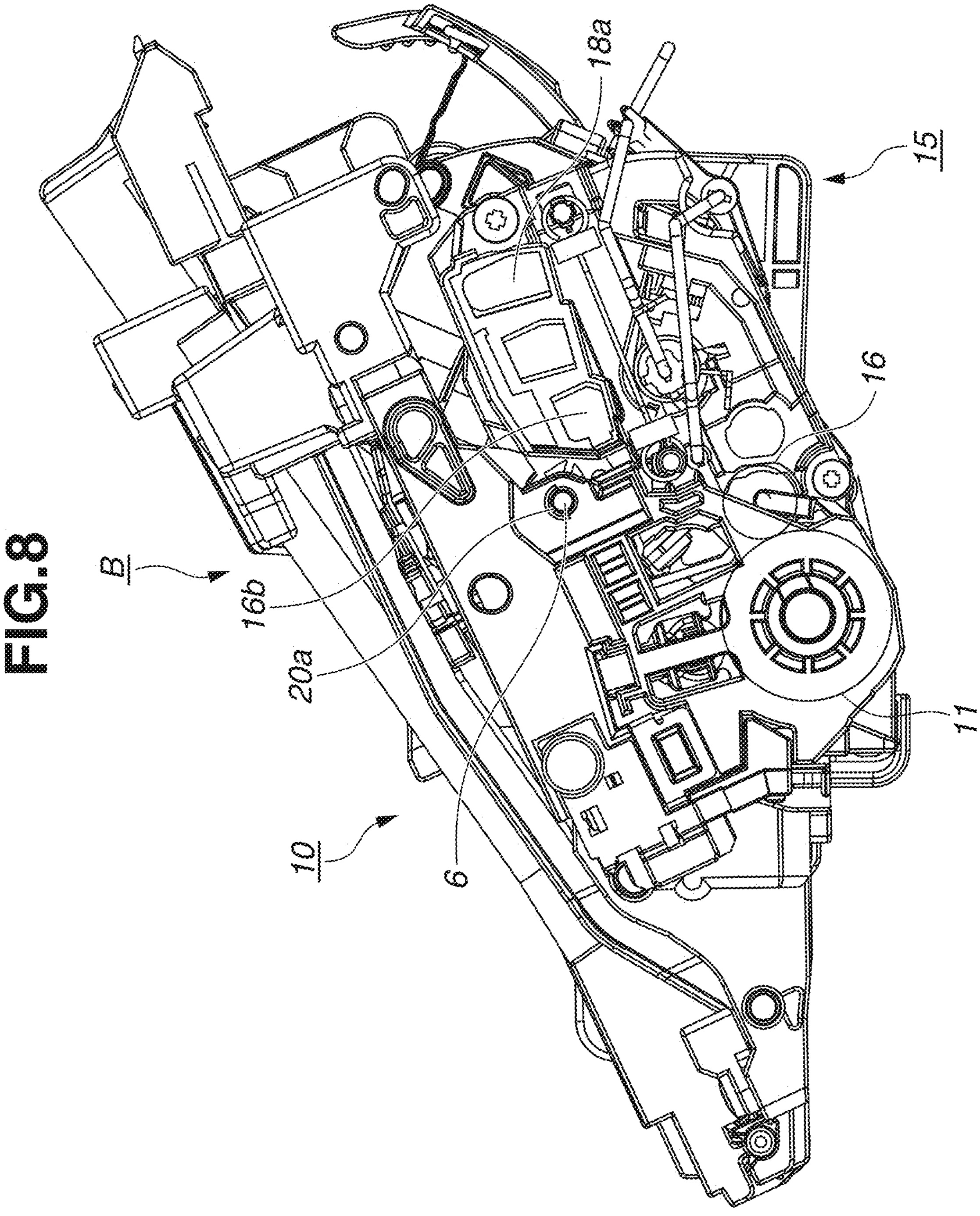
FIG. 8 is a side view of the process cartridge.

The configuration of the process cartridge B according to the present exemplary embodiment will be described in detail with reference to FIGS. 3, 4, 6A, 6B, 7A, 7B, and 8. FIGS. 6A and 6B are exploded perspective views of the process cartridge B. FIGS. 7A and 7B are side views illustrating the movement of the development unit 15 relative to the drum unit 11. FIG. 8 is a side view of the process cartridge B.

As described above, the photosensitive member unit 10 includes the drum unit 11, the charging roller 12, and the cleaning blade 17. The development unit 15 includes the development roller 16, the development blade 18, the development chamber 151, the developer storage unit 152, and the toner reception unit 153. As illustrated in FIG. 8, the development unit 15 includes a development contact point 16*b* and a development blade contact point 18*a*. The development contact point 16*b* and the development blade contact point 18*a* are electrically connected with the development roller 16 and the development blade 18, respectively, and are electrically connected with contact points provided in the printer main body A when the process cartridge B is attached to the printer main body A. The voltage is thereby applied to the development roller 16 and the development blade 18 from a power source of the printer main body A.

The development unit 15 is movably (swingably) coupled to the photosensitive member unit 10.

Specifically, as illustrated in FIGS. 6A and 6B, bearing members 4 and 5 are arranged at the ends of the development unit 15 in the rotational axis direction of the development roller 16. The development unit 15 is coupled to the photosensitive member unit 10 in such a manner as to be rotatable (swingable) around a pivotal axis line 8 defined by a straight line including connection portions 8*a* and 8*b*. The pivotal axis line 8 is approximately parallel to a rotational axis line 11*b* of the drum unit 11.

The configuration in which the development unit 15 is supported by the photosensitive member unit 10 will be described in detail.

As illustrated in FIGS. 6A, 7A, and 7B, a cylindrical portion 5*a* of the bearing member 5 is supported by a support hole 7*a* provided in a side cover 7 of the photosensitive member unit 10. The connection portion 8*a* is defined by the support hole 7*a* of the side cover 7 and the cylindrical portion 5*a* of the bearing member 5. The support hole 7*a* of the side cover 7 and the cylindrical portion 5*a* of the bearing member 5 are arranged approximately concentrically.

As illustrated in FIGS. 6B and 8, a pin 6 is inserted into a hole 20*a* of a cleaning frame 20 of the photosensitive member unit 10 and a hole 4*a* of the bearing member 4. The connection portion 8*b* is defined by the pin 6 and the hole 4*a* of the bearing member 4. The hole 4*a* may be a so-called elongate hole.

The connection portions 8*a* and 8*b* are concentrically arranged, and the pivotal axis line 8 is defined by the straight line including the connection portions 8*a* and 8*b*.

As described above, the development unit 15 is supported in such a manner as to be rotatable around the pivotal axis line 8 with respect to the photosensitive member unit 10. The development unit 15 is pressed toward the photosensitive member unit 10 by pressure springs 19*a* and 19*b* each serving as an elastic member, and the development roller 16 comes into contact with the drum unit 11.

Next, contact and separation operations of the development unit 15 relative to the photosensitive member unit 10 will be described with reference to FIGS. 7A and 7B. In FIGS. 7A and 7B, the illustration of the side cover 7 is omitted to illustrate a separation mechanism 100 of the printer main body A.

As illustrated in FIG. 7A, the bearing member 5 is provided with a protruding portion 5*b*. At a position where the protruding portion 5*b* is not in contact with the separation mechanism 100 as illustrated in FIG. 7A, the development unit 15 is located at a first position. In a state in which the development unit 15 is located at the first position, the electrostatic latent image formed on the surface of the drum unit 11 is developed by the development roller 16. The state in which the development unit 15 is located at the first position can also be called an image formation state of the process cartridge B.

As illustrated in FIG. 7B, when the separation mechanism 100 provided on the printer main body A comes into contact with the protruding portion 5*b*, the development unit 15 rotates around the pivotal axis line 8 in an R2 direction, and the development unit 15 is located at a second position retracted from the first position. The state in which the development unit 15 is located at the second position can also be called a non-image formation state of the process cartridge B.

A distance between the development roller 16 and the drum unit 11 is longer when the development unit 15 is located at the second position than when the development unit 15 is located at the first position. In the present exemplary embodiment, when the development unit 15 is located at the first position, the development roller 16 is in contact with the drum unit 11. When the development unit 15 is located at the second position, the drum unit 11 and the development roller 16 are separated. That is, the first position can be called a contact position of the development unit 15, and the second position can be called a separation position of the development unit 15.

If the separation mechanism 100 returns from the state illustrated in FIG. 7B to the state illustrated in FIG. 7A, the separation mechanism 100 is separated from the protruding portion 5*b*, and the development roller 16 and the drum unit 11 come into contact with each other again by the pressure springs 19*a* and 19*b*.

That is, the state of the development unit 15 is switched by the separation mechanism 100 between a state in which the development unit 15 is located at the contact position and a state in which the development unit 15 is located at the separation position, and the state of the process cartridge B is accordingly switched between the image formation state and the non-image formation state. With this configuration, the degradation of toner and unnecessary toner consumption in a non-image formation state are suppressed.

As illustrated in FIGS. 6A and 6B, the photosensitive member unit 10 includes the cleaning frame 20, the stay 21, and the side cover 7. The cleaning frame 20 supports the cleaning blade 17, the charging roller 12, and the charging roller cleaner 14. The drum unit 11 is rotatably supported on one side by a drum pin 22 attached to the cleaning frame 20, and on an opposite side by a drum support portion 7*b* provided on the side cover 7.

The photosensitive member unit 10 can be said to include a unit frame (first frame) 10*f* including the cleaning frame 20, the stay 21, and the side cover 7. In other words, the cleaning frame 20, the stay 21, and the side cover 7 each constitute a part of the unit frame 10*f*.

As illustrated in FIG. 3, the photosensitive member unit 10 includes the second waste toner conveyance path 10*c* for conveying, to the toner cartridge C, waste toner removed by the cleaning blade 17 from the drum unit 11.

The waste toner removed from the drum unit 11 is conveyed by a waste toner conveyance unit from the first waste toner chamber 10*a* to the first waste toner conveyance path 10*b* and then to the second waste toner conveyance path 10*c*. On the second waste toner conveyance path 10*c*, a conveyance screw 71 is arranged. The conveyance screw 71 is configured to rotate around a rotational axis line AL2, and conveys the waste toner in the direction of the rotational axis line AL2. In the present exemplary embodiment, the direction of the rotational axis line AL2 is orthogonal to the direction of the rotational axis line 11*b* of the drum unit 11.

As illustrated in FIG. 5, the photosensitive member unit 10 of the process cartridge B includes the first reception port 21*c* through which toner supplied from the toner cartridge C is received. The first reception port 21*c* is included in the stay 21.

Toner Cartridge

The toner cartridge C will be described with reference to FIGS. 9, 10, 11, 12A, 12B, 13, 14, 15, 16, and 17.

Figure 9:
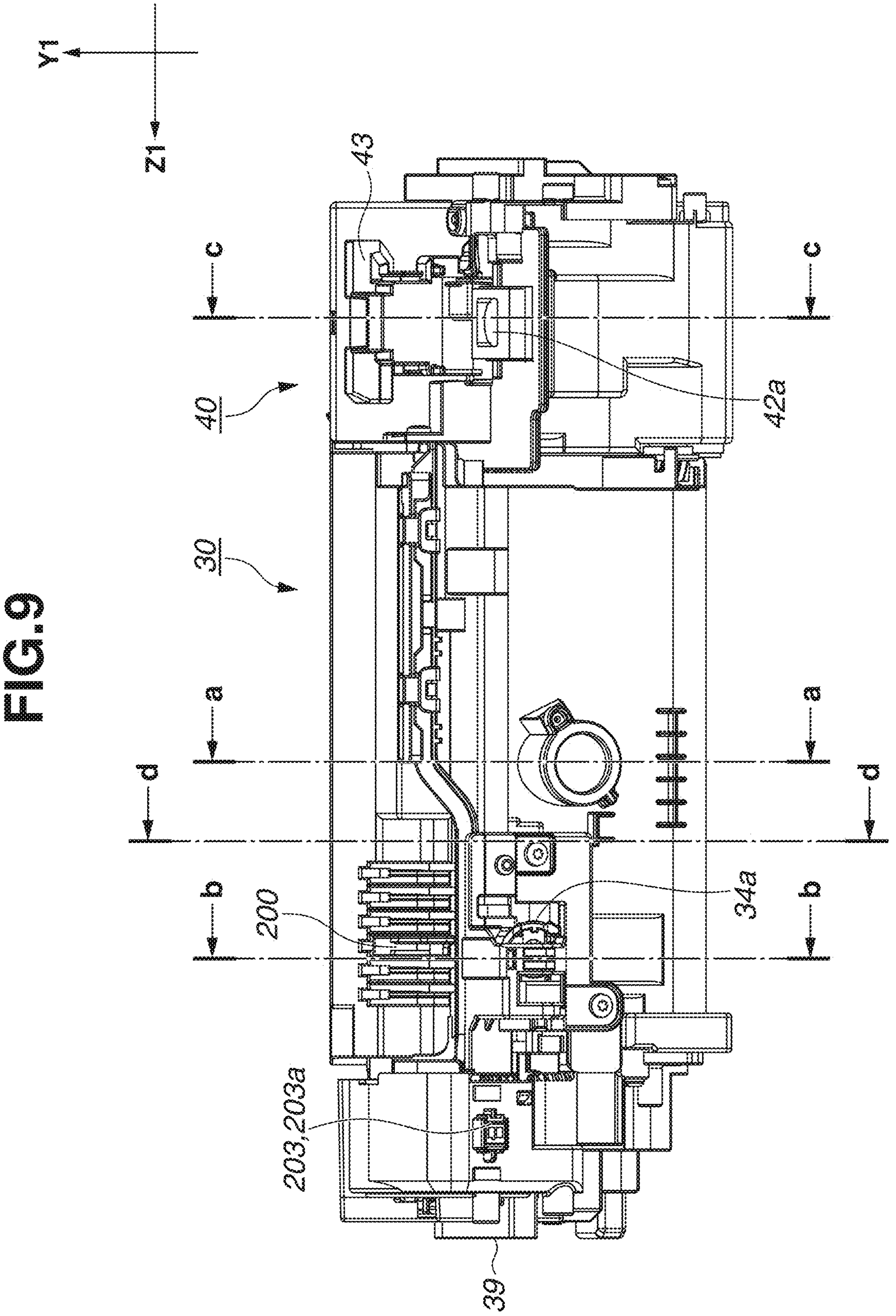
FIG. 9 is a front view of a toner cartridge.
Figure 10:
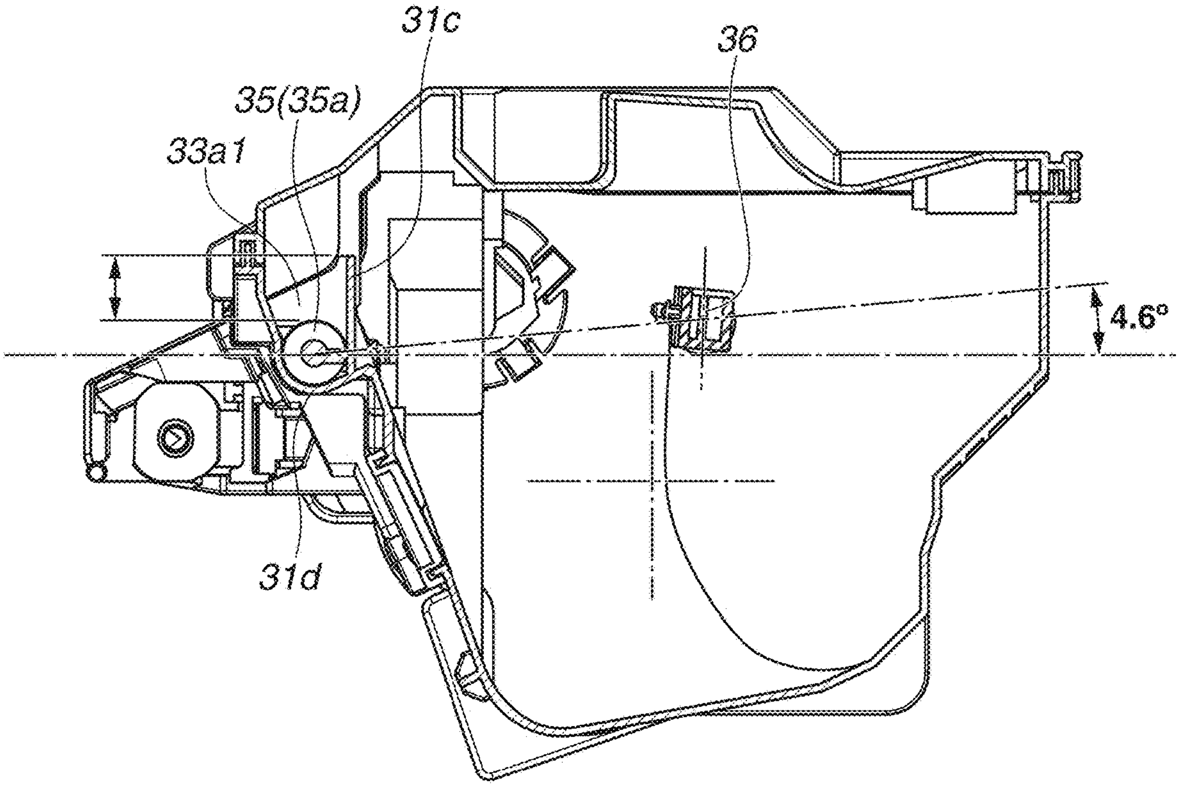
FIG. 10 is a cross-sectional view of a toner cartridge.
Figure 11:
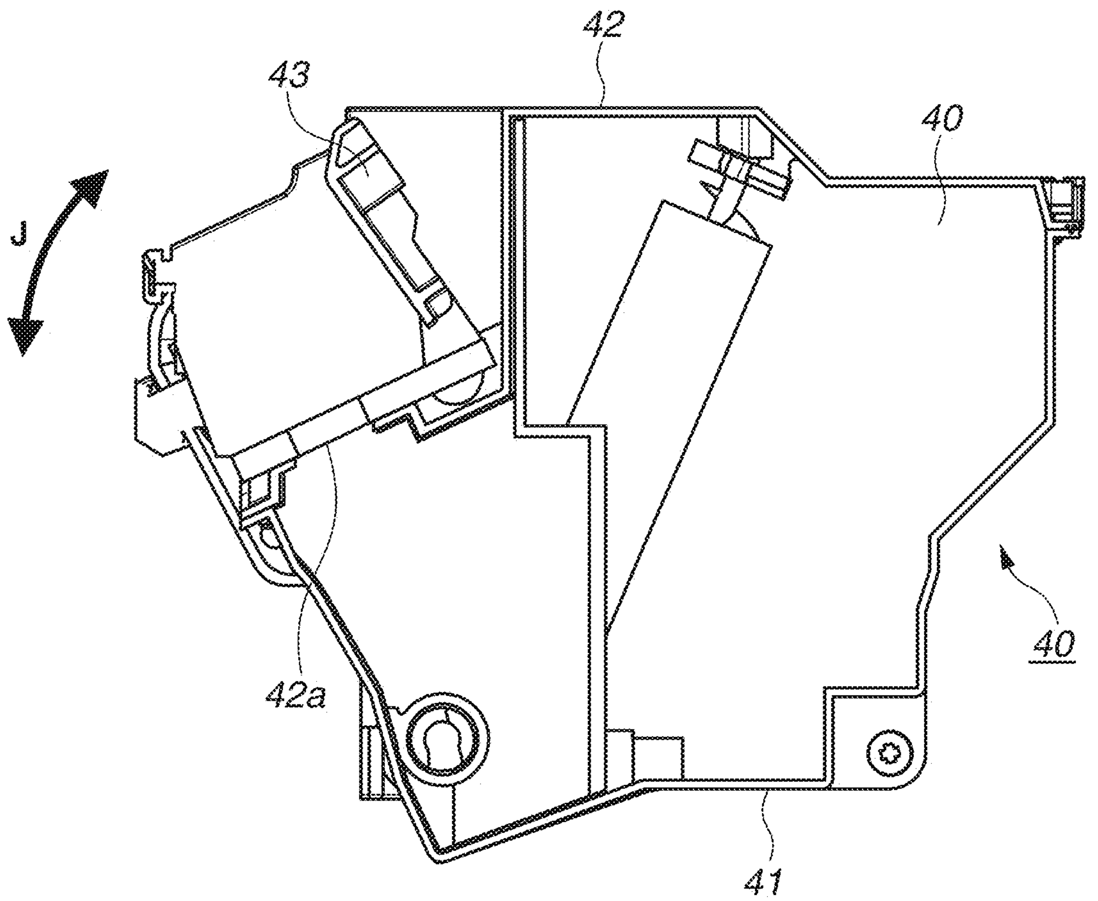
FIG. 11 is a cross-sectional view of the toner cartridge.
Figure 12B:
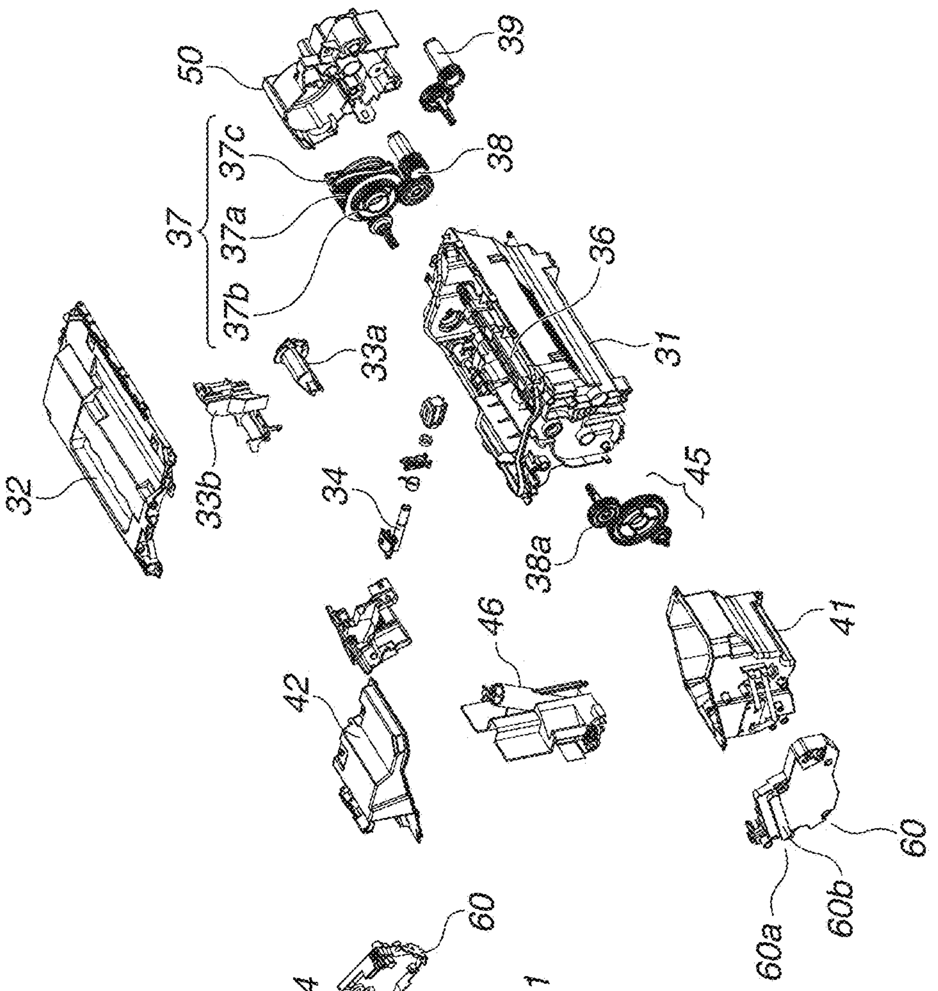
FIGS. 12A and 12B are exploded perspective views of the toner cartridge.
Figure 12A:
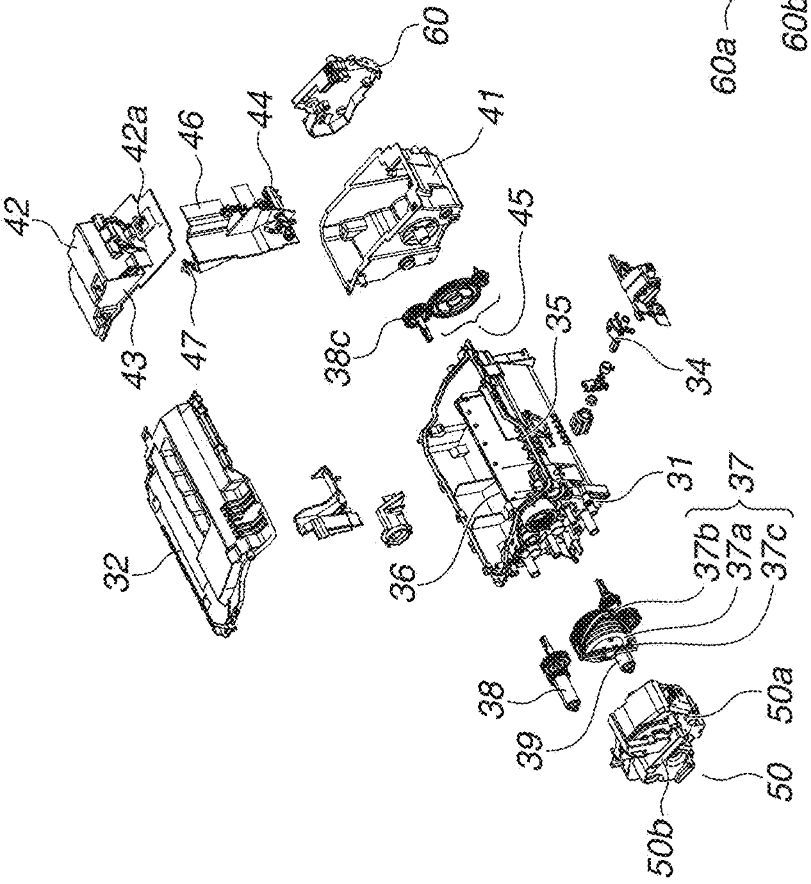
Figure 13:
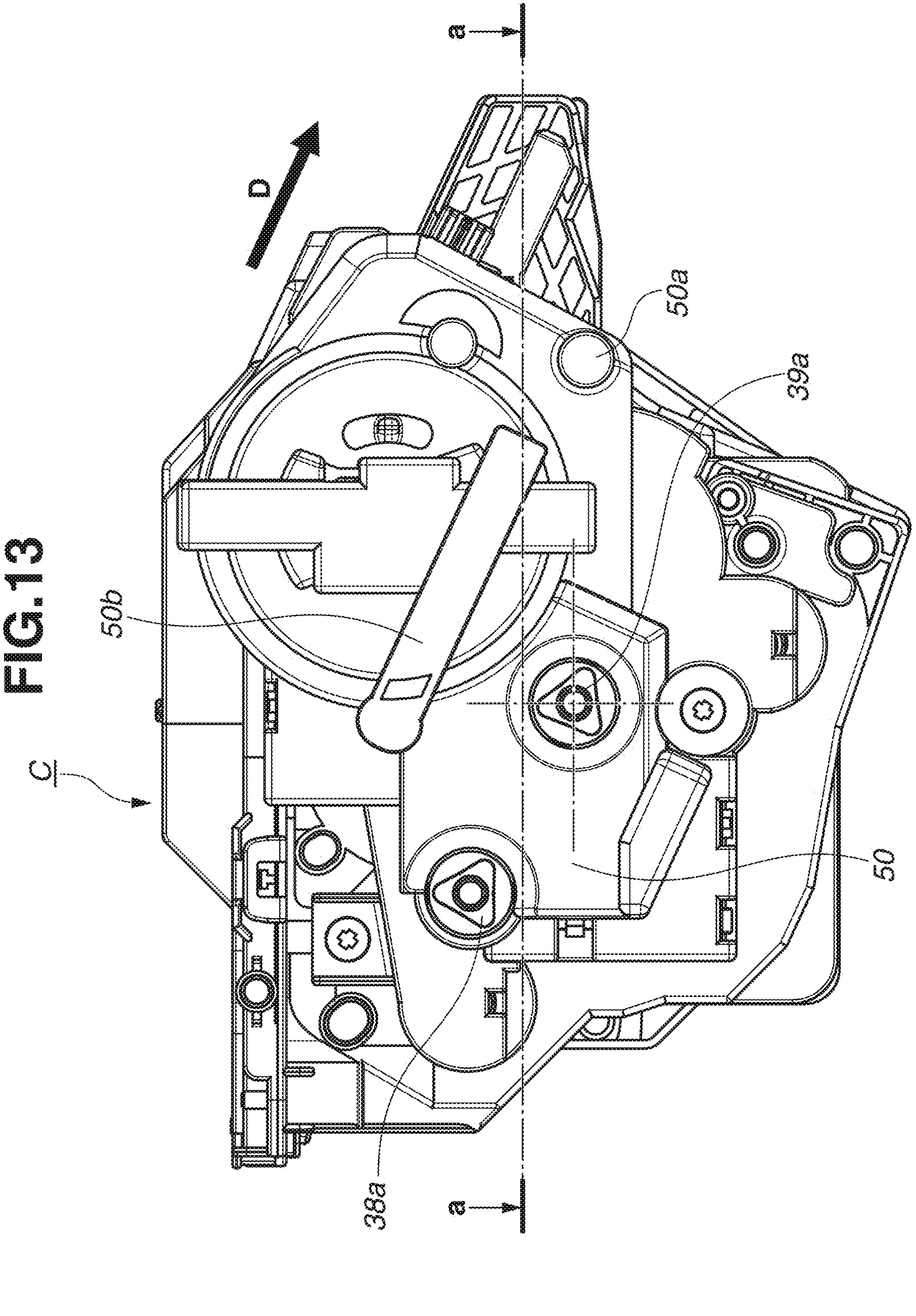
FIG. 13 is a side view of the toner cartridge.
Figure 14:
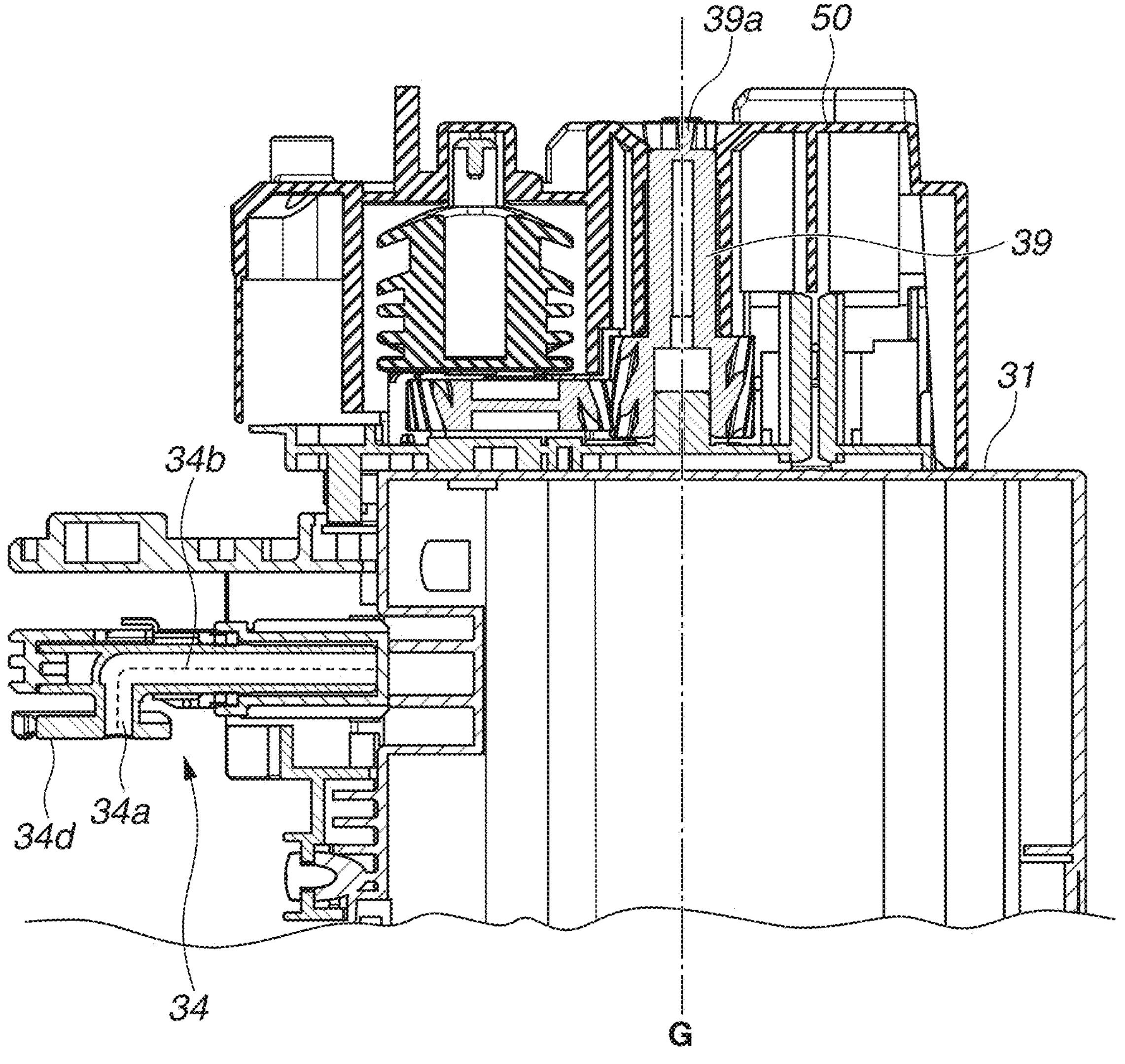
FIG. 14 is a cross-sectional view of the toner cartridge.
Figure 15:
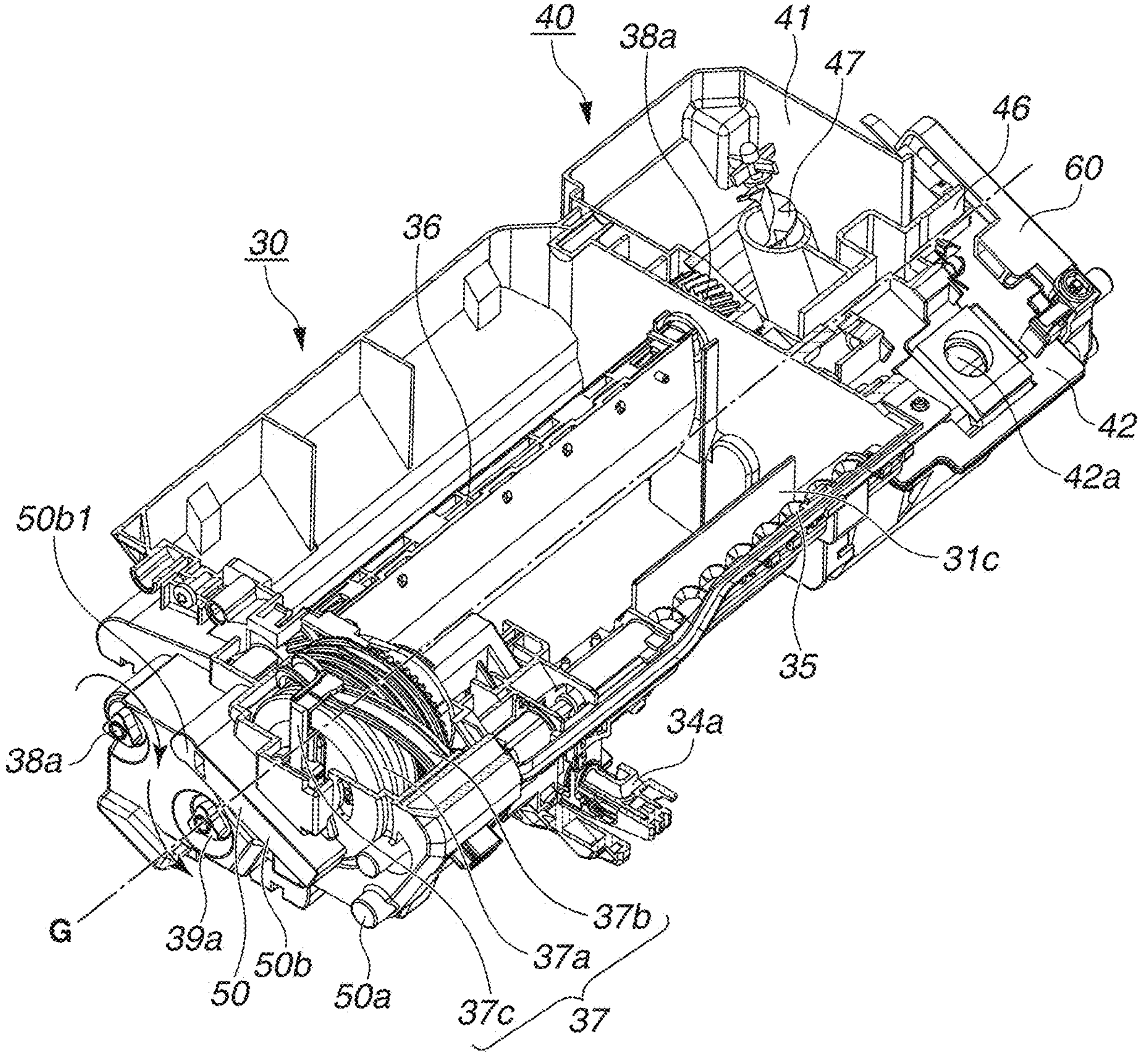
FIG. 15 is a perspective view illustrating an internal structure of the toner cartridge.
Figure 16:
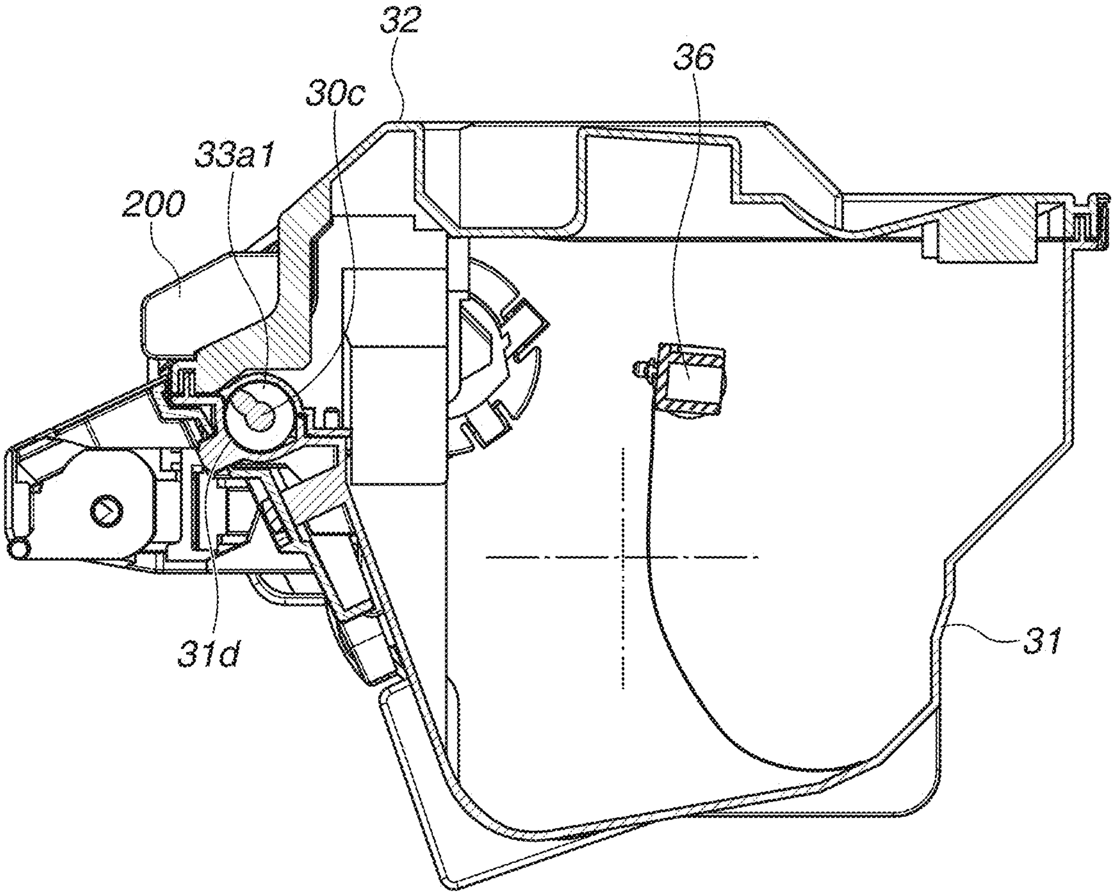
FIG. 16 is a cross-sectional view of the toner cartridge.

FIG. 9 is a front view of the toner cartridge C. More specifically, FIG. 9 is a front view of the toner cartridge C illustrating a state in which the toner cartridge C is attached to the printer main body A and engaged with the process cartridge B. FIG. 10 is a cross-sectional view of the toner cartridge C. More specifically, FIG. 10 is a cross-sectional view of the toner cartridge C taken along a line a-a in FIG. 9. FIG. 11 is a cross-sectional view of the toner cartridge C. More specifically, FIG. 11 is a cross-sectional view of the toner cartridge C taken along a line c-c in FIG. 9. FIGS. 12A and 12B are exploded perspective views of the toner cartridge C. FIG. 13 is a side view of the toner cartridge C. FIG. 14 is a cross-sectional view of the toner cartridge C. More specifically, FIG. 14 is a cross-sectional view of the toner cartridge C taken along a line a-a in FIG. 13. FIG. 15 is a perspective view illustrating an internal structure of the toner cartridge C. FIG. 16 is a cross-sectional view of the toner cartridge C.

Figure 17:
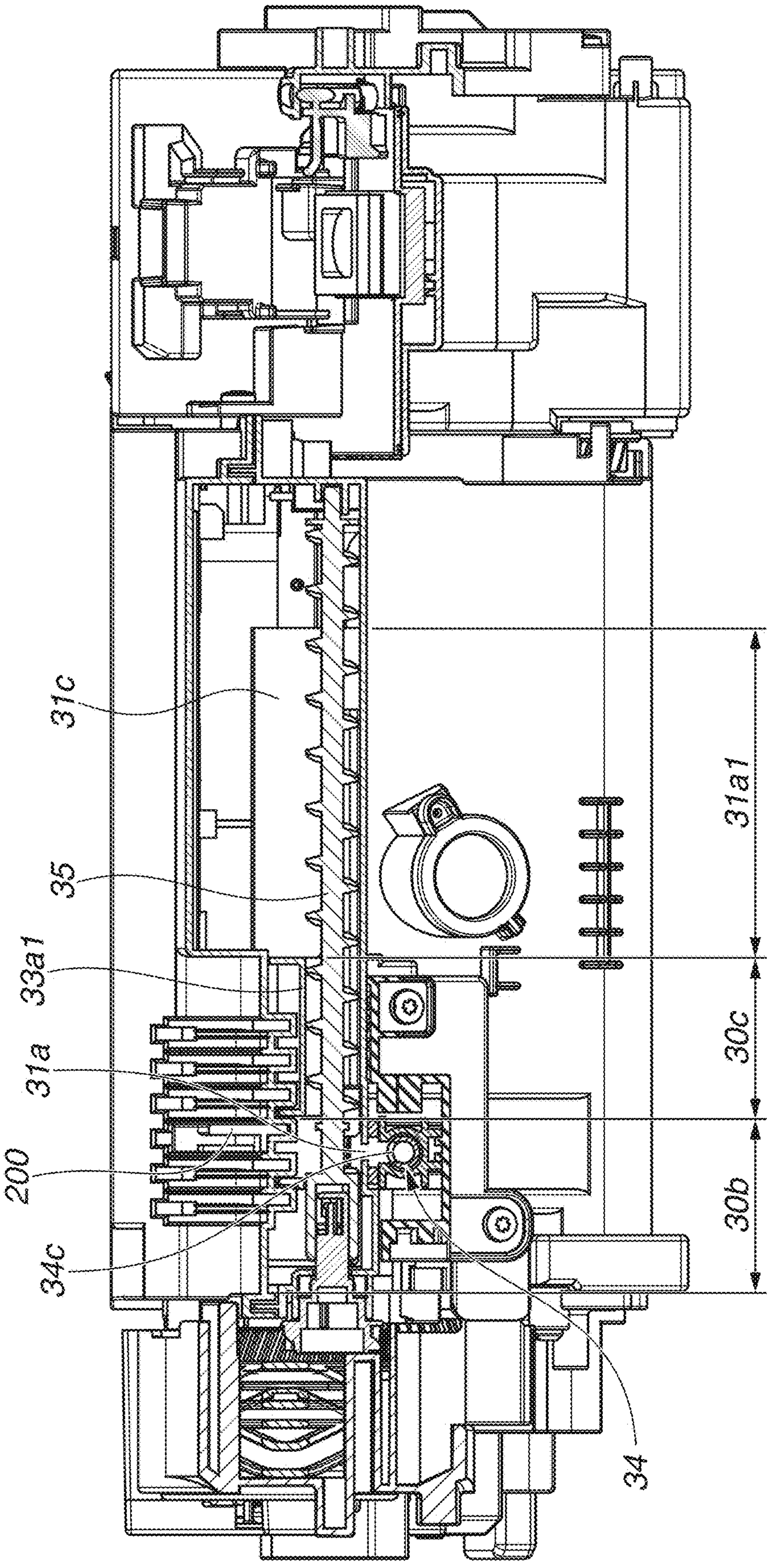
FIG. 17 is a cross-sectional view of the toner cartridge.

FIG. 17 is a cross-sectional view of the toner cartridge C, and is a cross-sectional view illustrating the toner cartridge C cut along a rotational axis line of a conveyance screw 35.

As illustrated in FIGS. 9, 10, and 11, the toner cartridge C includes a toner storage case 30 storing toner to be supplied to the process cartridge B, and a waste toner storage case 40 storing waste toner collected from the process cartridge B.

The overview of the toner storage case 30 will be described below. As illustrated in FIGS. 9, 10, 12A, and 12B, the toner storage case 30 includes a storage frame 31 and a storage lid 32 in such a manner that a toner storage chamber is formed. The toner storage chamber stores the conveyance screw 35 that conveys toner toward a supply toner discharge port 34*a*, and a conveyance unit 36 that conveys toner toward the conveyance screw 35. As illustrated in FIG. 9, the toner storage case 30 includes a guided projection 200. When the toner cartridge C is attached to the printer main body A, the guided projection 200 is guided by the printer main body A, so that the movements of the toner cartridge C in the Z1 and Z2 directions are regulated.

The left-right direction in FIG. 10 corresponds to the horizontal direction in a state in which the attachment of the toner cartridge C to the printer main body A is completed. In the present exemplary embodiment, in the state in which the attachment of the toner cartridge C to the printer main body A is completed, as illustrated in FIG. 10, a straight line connecting the rotational center of the conveyance screw 35 and the rotational center of the conveyance unit 36 is inclined by 4.6° with respect to the horizontal direction.

As illustrated in FIG. 17, the storage frame 31 includes a frame discharge port 31*a*. The frame discharge port 31*a* is arranged at a position corresponding to the downstream end of the conveyance screw 35 in a conveyance direction of the conveyance screw 35.

As illustrated in FIGS. 10 and 16, the storage frame 31 includes an arc portion 31*d*. The arc portion 31*d* has an arc shape having a radius approximately equal to an outer diameter of a spiral fin 35*a* of the conveyance screw 35.

As illustrated in FIG. 10, the storage frame 31 includes a partition wall 31*c*, and a toner storage portion 31*a*1 (refer to FIG. 17) is formed by the partition wall 31*c* in an upper part of the conveyance screw 35 in a gravitational force direction. The upstream end of the conveyance screw 35 in the conveyance direction of the conveyance screw 35 is exposed toward the toner storage portion 31*a*1. The height of the partition wall 31*c* is higher than the peak of the conveyance screw 35, and the upper side of the toner storage portion 31*a*1 in the gravitational force direction is opened in the state in which the attachment of the toner cartridge C is completed.

An amount of toner conveyed by the conveyance unit 36 varies depending on the amount of toner stored in the toner storage case 30. By providing the toner storage portion 31*a*1, it is possible to store a certain amount of toner or more in the toner storage portion 31*a*1 irrespective of the amount of toner stored in the toner storage case 30. A variation in the amount of toner conveyed by the conveyance screw 35 can be accordingly suppressed.

As illustrated in FIG. 10, the toner storage case 30 includes a partition member. The partition member includes a level-off portion **33*a*1 between the partition wall 31*c* and the frame discharge port 31*a* in the conveyance direction of the conveyance screw 35, and the level-off portion 33*a*1 regulates a toner conveyance amount to a fixed amount. The level-off portion 33*a*1 has an arc shape having a radius approximately equal to an outer diameter of the conveyance screw 35 (outer diameter of the fin 35*a***).

Due to the conveyance screw 35 being surrounded by the level-off portion **33*a*1 and the arc portion 31*d* of the storage frame 31, it is possible to keep an amount of toner to be conveyed by the conveyance screw 35 constant. The length of the level-off portion 33*a*1 is desirably equal to or larger than a length of two pitches of the conveyance screw 35**.

The length of the level-off portion **33*a*1 is desirably set to a predetermined length or more to reduce a back flow of toner that might be caused by air of a pump 37*a* to be described below. The portion surrounded by the level-off portion 33*a*1 and the arc portion 31*d* of the storage frame 31 is called a conveyance path 30*c* (refer to FIG. 17). Due to the partition wall 31*c* and the level-off portion 33*a*1, it is possible to reduce a variation in amount of toner to be conveyed to the frame discharge port 31*a***.

As illustrated in FIG. 12A, the toner cartridge C includes the pump **37*a* serving as a volume variation unit, which is located on the outside of the toner storage case 30**.

As illustrated in FIGS. 12A and 13, a pump-screw input unit 39 for driving the pump **37*a* and the conveyance screw 35, and an agitation input unit 38 for driving the conveyance unit 36 are rotatably supported on the outside of the toner storage case 30**.

As illustrated in FIG. 12A, the toner cartridge C includes a drive-side side cover 50 covering the pump-screw input unit 39, the agitation input unit 38 and the pump **37*a*. As illustrated in FIG. 13, the pump-screw input unit 39 and the agitation input unit 38 include coupling portions 39*a* and 38*a*, respectively, each having a projecting shape exposed from the drive-side side cover 50. The coupling portions 39*a* and 38*a*** receive a drive force from the printer main body A by engaging with respective coupling members of the printer main body A.

As illustrated in FIG. 15, a rotational axis line of the pump-screw input unit 39 is set to an axis line G. The axis line G is arranged approximately parallel to the rotational axis line of the drum unit 11 of the process cartridge B.

As illustrated in FIG. 15, the toner cartridge C includes a cam gear **37*b* for expanding and contracting the pump 37*a*, and a link arm 37*c*. The cam gear 37*b* includes a gear portion to which a drive force is transmitted by the coupling portion 39*a*, and a cam portion to which the link arm 37*c* is attached. By the rotation of the cam gear 37*b*, the link arm 37*c* is reciprocated in the direction of the axis line G. That is, an expansion/contraction direction of the pump 37*a* is a direction approximately equal to the axis line G. The pump 37*a* is compressed, and then the pump 37*a* feeds air to a supply chamber 30*b* (refer to FIG. 17) in which the frame discharge port 31*a*** is arranged.

As illustrated in FIG. 12B, the toner storage case 30 includes a nozzle member formed by a first portion **33*a* and the partition member (a second portion) 33*b*. The nozzle member (first and second portions 33*a* and 33*b*) is connected with the supply chamber 30*b*, and guides air fed from the pump 37*a* to the supply chamber 30*b***.

As illustrated in FIG. 17, a shutter member 34 is arranged below the frame discharge port **31*a*. The shutter member 34 has a function as a carrier pipe member that releases toner to the outside of the toner cartridge C, and includes the supply toner discharge port 34*a* through which toner is released to the outside of the toner cartridge C (refer to FIG. 14). The shutter member 34** is rotatably attached to the toner cartridge C.

Compressed air generated by a contracting operation of the pump **37*a* is guided by the nozzle member (first and second portions 33*a* and 33*b*) to the supply chamber 30*b*, and mixed with toner conveyed by the conveyance screw 35**.

Then, the toner is fed from the frame discharge port **31*a* to the shutter member 34 through an inlet 34*c*, and supplied from the supply toner discharge port 34*a*** to the process cartridge B.

As illustrated in FIGS. 14 and 17, the shutter member 34 includes the inlet **34*c* via which toner is received from the frame discharge port 31*a*, a conveyance path 34*b* through which toner received via the inlet 34*c* passes, the supply toner discharge port 34*a*, and an end 34*d* at which the supply toner discharge port 34*a*** is formed.

The conveyance path **34*b* intersects with the axis line G that is the rotational axis line of the pump-screw input unit 39, and extends in a direction away from the axis line G. The toner discharged from the supply toner discharge port 34*a* is discharged in a discharge direction having a component of a direction being parallel to the axis line G and being away from the pump-screw input unit 39**.

This can prevent the coupling portion of the printer main body A that is to be engaged with the coupling portion **39*a***, from being soiled with toner.

The shutter member 34 is configured to rotate in conjunction with the attachment of the toner cartridge C to the process cartridge B, and the supply toner discharge port **34*a*** is opened in conjunction with the attachment of the toner cartridge C to the process cartridge B.

As illustrated in FIG. 12A, the shutter member 34 and the pump-screw input unit 39 are provided on one end side of the toner storage case 30 in a longer direction (Z1 direction). In other words, in the Z1 direction, the shutter member 34 and the pump-screw input unit 39 are closer to the one end of the toner storage case 30 than to the center of the toner storage case 30. With this configuration, it is possible to reduce air pressure loss when toner is discharged by a variation in the volume of the pump **37*a***.

Next, the waste toner storage case 40 will be described. As illustrated in FIG. 11, the waste toner storage case 40 is formed by a storage frame 41 and a storage lid 42. The storage lid 42 is provided with a waste toner reception port **42*a*. The waste toner storage case 40 includes a waste toner shutter 43 for opening and closing the waste toner reception port 42*a*. The waste toner shutter 43** is opened and closed in a J direction in conjunction with the attachment and detachment of the toner cartridge C to and from the process cartridge B.

In a state in which the toner cartridge C is attached to the process cartridge B, the waste toner reception port **42*a* is connected with the second waste toner conveyance path 10*c* of the process cartridge B. The waste toner conveyed by the conveyance screw 71 is discharged from the waste toner reception port 42*a* to the inside of the waste toner storage case 40**.

As illustrated in FIG. 12A, in the waste toner storage case 40, a partition member 46, a first waste toner screw 44, and a second waste toner screw 47 are arranged. The first waste toner screw 44 conveys waste toner dropping from the waste toner reception port **42*a*, in the rotational axis direction of the drum unit 11. The second waste toner screw 47 is driven by the first waste toner screw 44, and conveys the waste toner conveyed by the first waste toner screw 44**, obliquely upward.

The drive force input to the agitation input unit 38 is transmitted to a non-drive-side of the toner storage case 30 via the conveyance unit 36, and transmitted to a gear 38*c*. The drive force transmitted to the gear 38*c* is then transmitted to the first waste toner screw 44 via a gear train 45.

The drive-side side cover 50 is attached to the toner storage case 30, and a non-drive-side side cover 60 is attached to the waste toner storage case 40.

Even when the pump-screw input unit 39 is not driven, the printer main body A can drive the agitation input unit 38. That is, even when toner is not supplied from the toner storage case 30 to the process cartridge B, the printer main body A can drive the first waste toner screw 44 and the second waste toner screw 47 of the waste toner storage case 40. Accordingly, it is possible to receive waste toner from the waste toner reception port 42*a*.

The printer main body A can transmit a drive force to the waste toner storage case 40 arranged on one end side of the toner cartridge C in the Z1 direction, via the agitation input unit 38 arranged on the other end side of the toner cartridge C in the Z1 direction.

By transmitting a drive force from one end to the other end of the storage frame 31 using the conveyance unit 36, it is possible to transmit a drive force to the waste toner storage case 40 without increasing the number of components dedicated for transmission of a drive force.

On the other hand, as illustrated in FIG. 9, on the drive-side side cover 50, a recording medium (memory) 203 including an electric contact portion 203*a* to be electrically connected with the printer main body A is installed.

The recording medium 203 is provided on the same side as the shutter member 34 in the longer direction. Because the recording medium 203 is installed above the supply toner discharge port 34*a* provided in the shutter member 34 in the gravitational force direction, the recording medium 203 has a configuration less susceptible to toner scattering.

Attaching/Detaching Method of Process Cartridge and Toner Cartridge

Figure 18B:
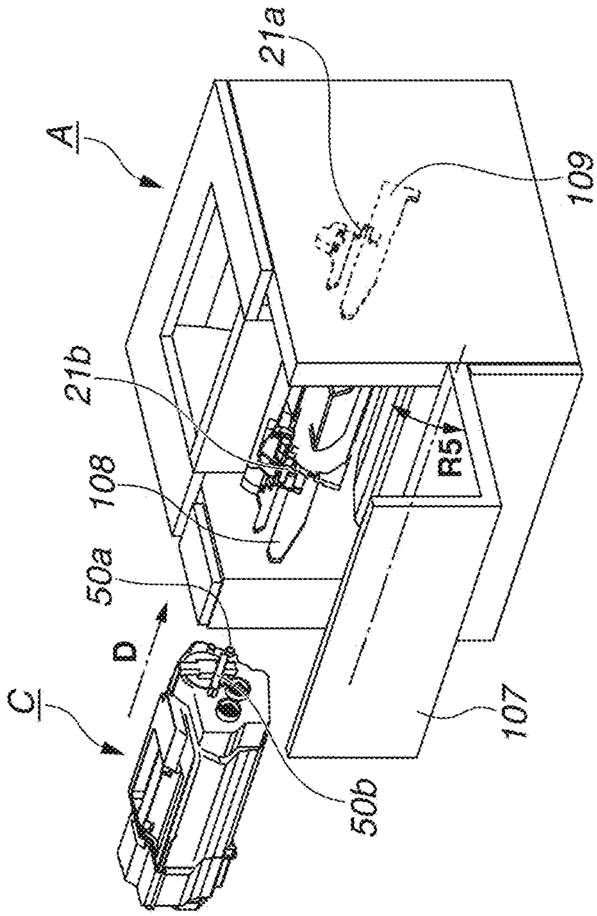
FIGS. 18A and 18B are schematic perspective views illustrating the attachment of the process cartridge and the toner cartridge to a printer main body.
Figure 18A:
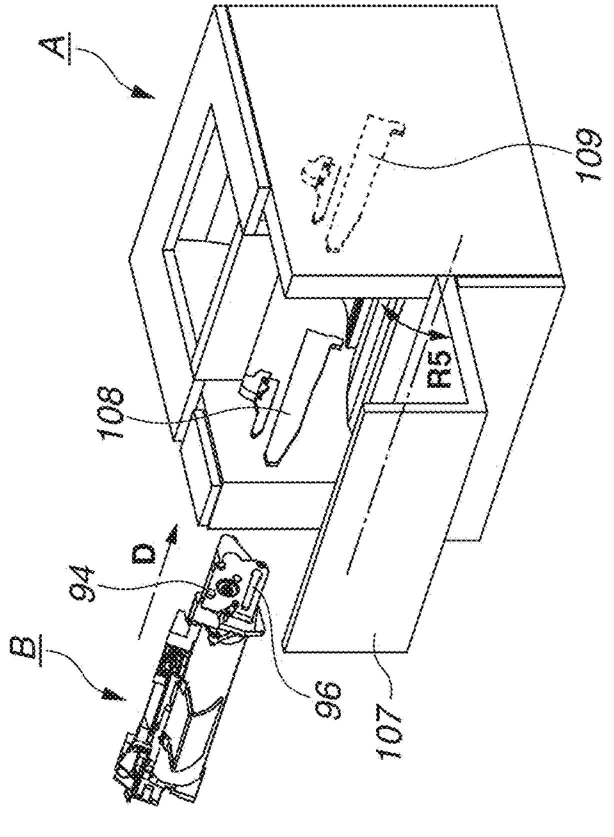
Figures 19A, 19B, 19C:
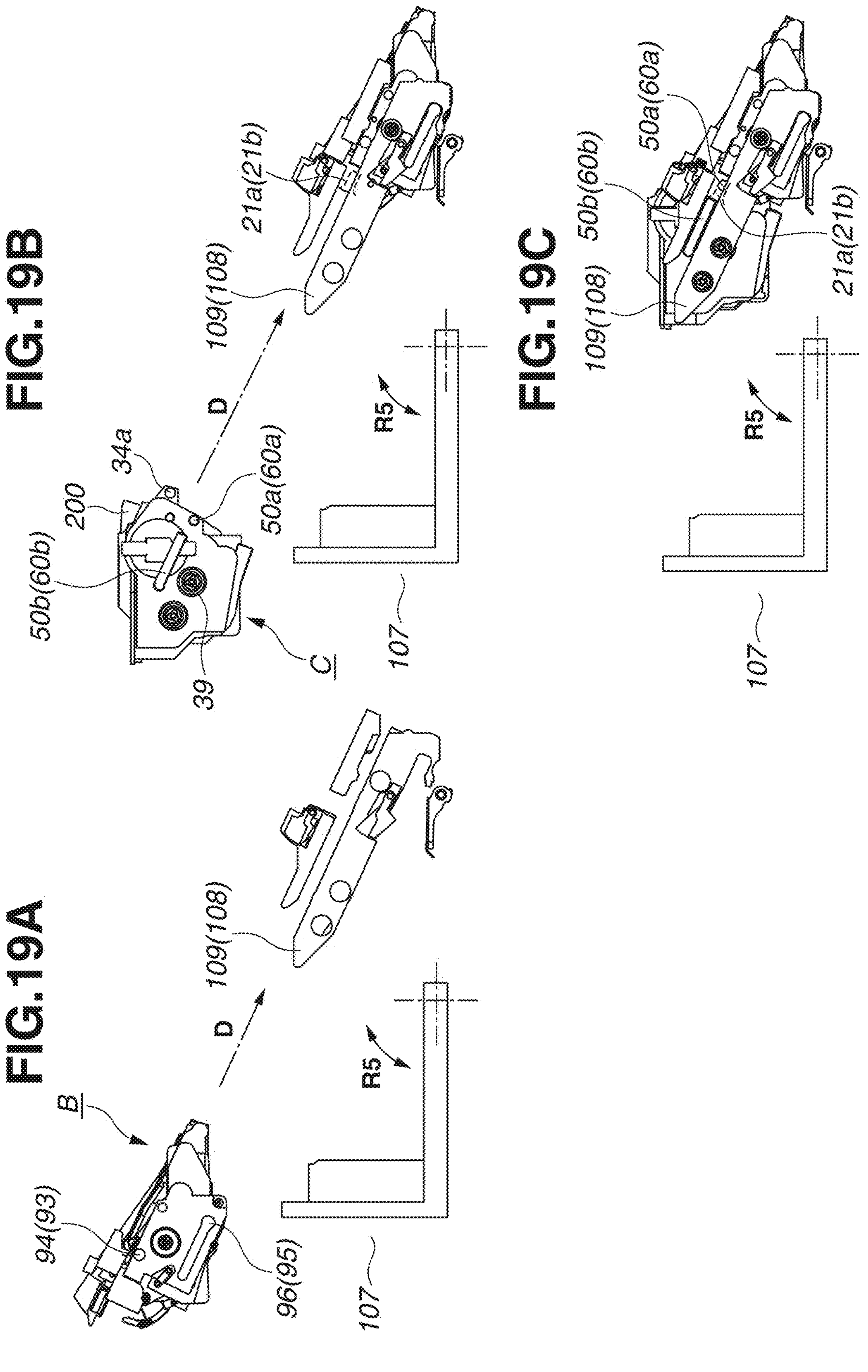
FIGS. 19A to 19C are schematic side views illustrating the attachment of the process cartridge and the toner cartridge to a printer main body.

Subsequently, an attaching/detaching method of the process cartridge B and the toner cartridge C to and from the printer main body A will be described with reference to FIGS. 18A, 18B, 19A, 19B, and 19C. FIGS. 18A and 18B are schematic perspective views illustrating the attachment of the process cartridge B and the toner cartridge C to the printer main body A. FIGS. 19A, 19B, and 19C are schematic side views illustrating the attachment of the process cartridge B and the toner cartridge C to the printer main body A.

As illustrated in FIG. 18A, an internal space of the printer main body A is an attachment portion of the process cartridge B and the toner cartridge C. As illustrated in FIGS. 19A, 19B, and 19C, an open/close door 107 is provided in such a manner as to be rotatable around a rotational axis line R5 with respect to the printer main body A.

The printer main body A includes guide portions 108 and 109. As illustrated in FIGS. 6A and 6B, the process cartridge B includes upper bosses 93 and 94 and lower bosses 95 and 96. The upper bosses 93 and 94 and the lower bosses 95 and 96 are included in the photosensitive member unit 10.

First of all, the process cartridge B is attached to the printer main body A. As illustrated in FIGS. 18A and 19A, the guide portion 108 is fit between the upper boss 93 and the lower boss 95, and the guide portion 109 is fit between the upper boss 94 and the and the lower boss 96. The process cartridge B is accordingly inserted in an arrow direction D while being guided by the guide portions 108 and 109.

After the process cartridge B is attached to the printer main body A, as illustrated in FIG. 18B, the toner cartridge C is attached to the printer main body A. When the toner cartridge C is attached to or detached from the printer main body A, a user can grip the entire toner cartridge C by gripping grip portions formed on the storage lid 32 and the storage frame 31.

As illustrated in FIG. 19B, the toner cartridge C includes positioning bosses 50*a* and 60*a* and guided portions 50*b* and 60*b*. In the longer direction of the toner cartridge C, the positioning bosses 50*a* and 60*a* are arranged on one end side and the other end side of the toner cartridge C. Similarly, in the longer direction of the toner cartridge C, the guided portions 50*b* and 60*b* are arranged on the one end side and the other end side of the toner cartridge C. In the attachment direction of the toner cartridge C, the guided portions 50*b* and 60*b* are located on the upstream side of the positioning bosses 50*a* and 60*a*.

As illustrated in FIG. 6B, the process cartridge B includes toner cartridge positioning portions 21*a* and 21*b*. More specifically, the stay 21 of the photosensitive member unit 10 includes the toner cartridge positioning portions 21*a* and 21*b*.

As illustrated in FIGS. 18B and 19B, the guided portions 50*b* and 60*b* are guided by the guide portions 108 and 109, respectively, and the toner cartridge C is accordingly inserted in the arrow direction D.

As illustrated in FIG. 19C, if the toner cartridge C is attached up to an insertion completion position, the positioning bosses 50*a* and 60*a* are fitted into the toner cartridge positioning portions 21*a* and 21*b*, respectively. At this time, the leading ends of the guided portions 50*b* and 60*b* in an insertion direction of the toner cartridge C are separated from the guide portions 108 and 109, and the rear ends of the guided portions 50*b* and 60*b* in the insertion direction of the toner cartridge C are in contact with the guide portions 108 and 109. The toner cartridge C is thereby positionally fixed to the process cartridge B. Further, when the rear ends of the guided portions 50*b* and 60*b* come into contact with the guide portions 108 and 109, the position of the toner cartridge C in the printer main body A is determined.

In other words, in the present exemplary embodiment, the toner cartridge C is positioned by the printer main body A and the process cartridge B. Nevertheless, the toner cartridge C may be positioned by the process cartridge B, or the toner cartridge C may be positioned by the printer main body A.

After the process cartridge B and the toner cartridge C are attached to the printer main body A, if the open/close door 107 is closed, the printer main body A enters a state of being able to execute image formation. When the toner cartridge C and the process cartridge B are to be detached, a procedure opposite to the above-described procedure is performed.

Toner Supply to Process Cartridge

Figure 20A:
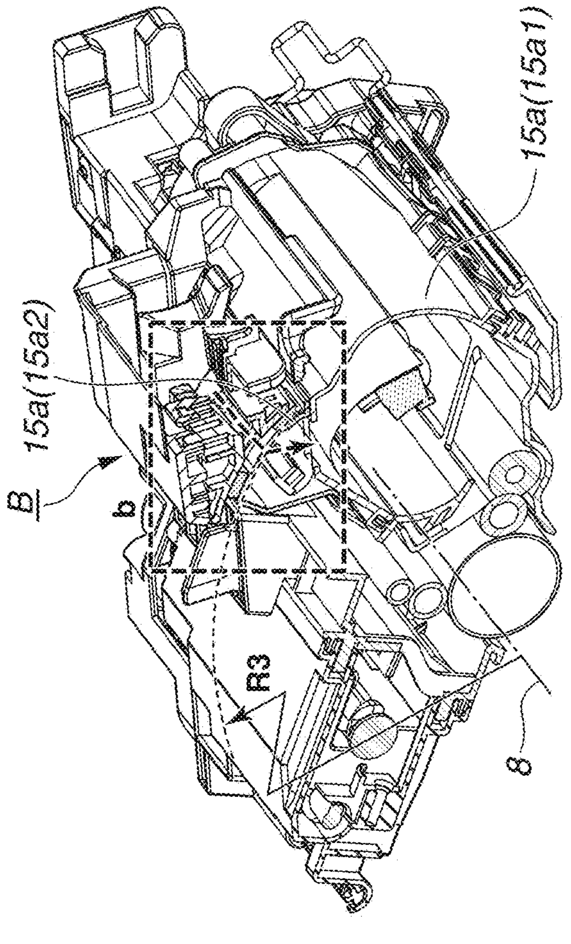
FIGS. 20A and 20B are a cross-sectional view of the process cartridge and an enlarged view of a part of the process cartridge, respectively.
Figure 20B:
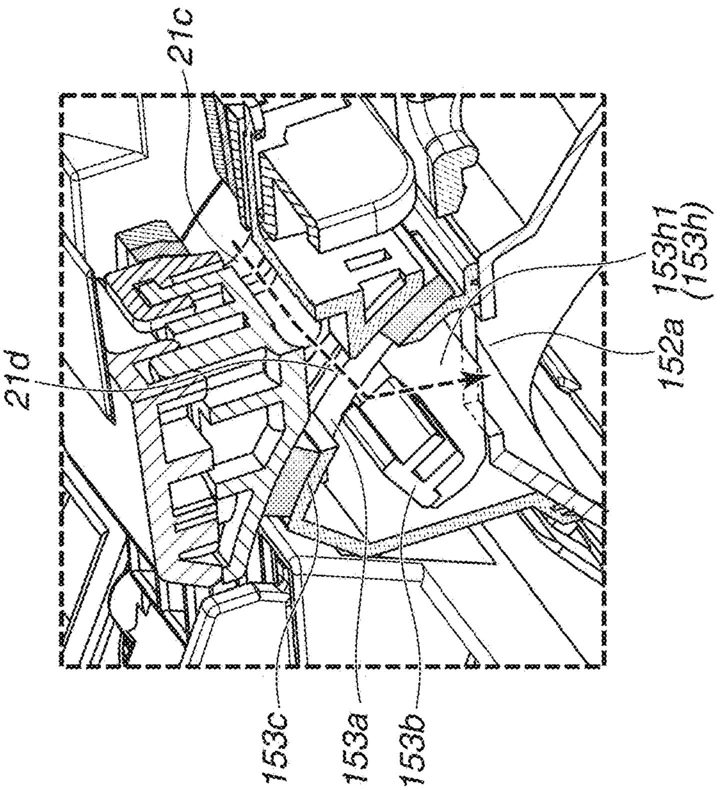
Figure 21:
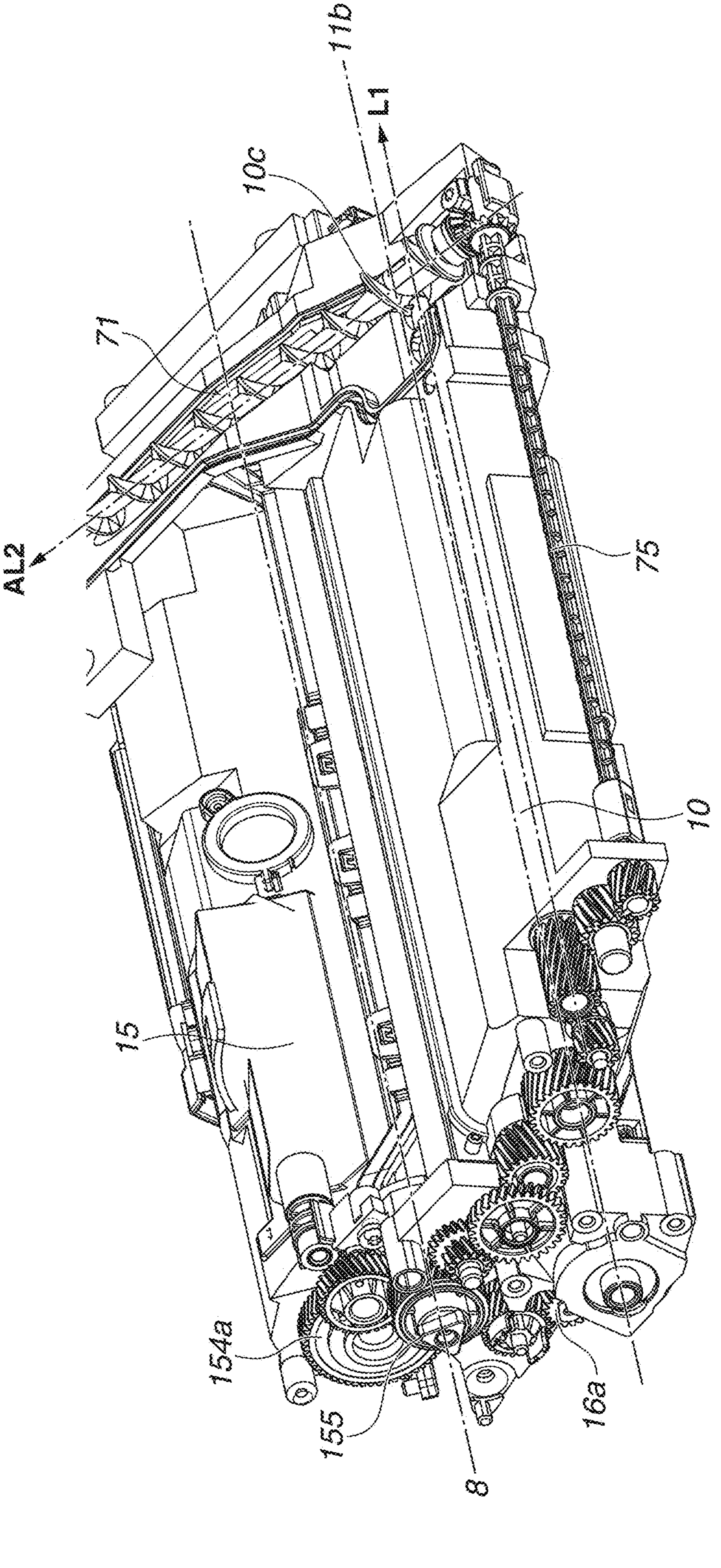
FIG. 21 is a perspective view of the process cartridge.
Figure 22:
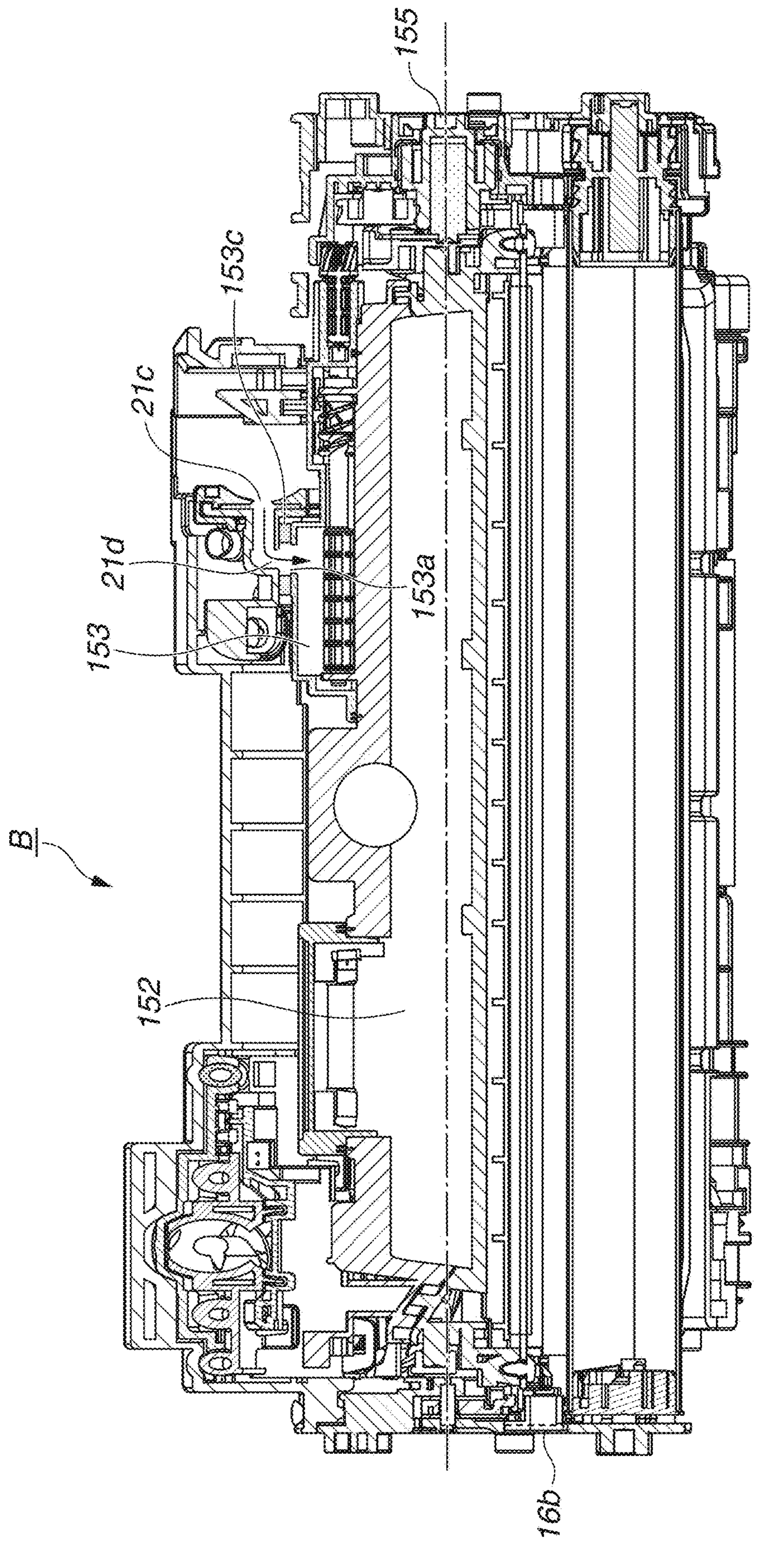
FIG. 22 is a cross-sectional view of the process cartridge.

Specifically, toner supply to the process cartridge B will be described with reference to FIGS. 7, 20A, 20B, 21, and 22. FIGS. 20A and 20B are cross-sectional views of the process cartridge B, and illustrate a flow of toner supplied from the first reception port 21*c*. FIG. 20B is an enlarged view of a portion surrounded by a dotted line b in FIG. 20A. FIG. 21 is a perspective view of the process cartridge B, and illustrates a drive train of the process cartridge B. FIG. 22 is a cross-sectional view of the process cartridge B. More specifically, FIG. 22 is a cross-sectional view of the process cartridge B cut along the longer direction.

As described above, toner is supplied to the process cartridge B from the toner cartridge C. The toner supplied from the toner cartridge C is supplied to the development unit 15 through the stay 21 of the photosensitive member unit 10. The photosensitive member unit 10 has a function as a supply unit that supplies toner to the development unit 15, and a relay unit. In other words, the photosensitive member unit 10 includes a toner pathway (relay pathway) through which toner to be supplied from the toner cartridge C to the development unit 15 passes. The development unit 15 has a function as a reception unit that receives toner from the photosensitive member unit 10.

Specifically, as illustrated in FIG. 20B, the stay 21 includes a first reception port (relay reception port, relay acceptance port) 21*c* through which toner supplied from the toner cartridge C is received. The stay 21 includes a stay discharge port (first discharge port, relay discharge port) 21*d* through which toner supplied from the toner cartridge C is discharged toward the development unit 15. The toner received through the first reception port 21*c* is discharged from the stay discharge port 21*d*.

The development unit 15 includes a development frame (reception frame, second frame) 15*a*. The development frame 15*a* includes a second reception port (second acceptance port) 153*a*, a development reception port (second discharge port) 152*a*, a toner pathway (communication path) 153*h*1, and the developer storage unit (storage chamber) 152.

The toner discharged from the stay discharge port 21*d* is received through the second reception port 153*a*. The toner pathway 153*h*1 is communicated with the second reception port 153*a* and the development reception port 152*a*. In the state in which the process cartridge B is attached to the printer main body A, the second reception port 153*a* is located above the development reception port 152*a*.

In the present exemplary embodiment, the development frame 15*a* includes a first development frame 15*a*1 including the development reception port 152*a* and the developer storage unit 152, and a second development frame 15*a*2 including the second reception port 153*a*. The first development frame 15*a*1 and the second development frame 15*a*2 are fixed to each other. The toner pathway 153*h*1 can also be considered to be formed by the first development frame 15*a*1 and the second development frame 15*a*2.

The toner discharged from the stay discharge port 21*d* passes through the second reception port 153*a* serving as an inlet of the toner reception unit 153 (FIG. 5) of the development unit 15, and enters the toner reception unit 153. The toner having passed through the second reception port 153*a* passes through the toner pathway 153*h*1, reaches the development reception port 152*a*, and is discharged from the development reception port 152*a* to the developer storage unit 152. In other words, the toner supplied to the toner reception unit 153 is supplied to the developer storage unit 152 (FIG. 5) through the development reception port 152*a*.

A seal member 153*c* is provided around the second reception port 153*a* to bond the stay discharge port 21*d* and the second reception port 153*a*. The seal member 153*c* has a seal opening 153*c*1, and the toner discharged from the stay discharge port 21*d* passes through the seal opening 153*c*1 and is received through the second reception port 153*a*. The seal member 153*c* is compressed between the photosensitive member unit 10 and the development unit 15.

As illustrated in FIGS. 7A, 7B, and 21, the development unit 15 is provided with a development coupling 155 serving as a drive input member for receiving a drive force from the printer main body A. The development coupling 155 transmits rotational force to a development roller gear 16*a* for transmitting rotational force to the development roller 16, and an agitation gear 154*a* for transmitting rotational force to the agitation member 154. The development coupling 155 is configured to receive a drive force from the outside of the process cartridge B (the printer main body A), and drive the development roller 16, the agitation member 154, and a shaft member 153*b* to be described below. In the present exemplary embodiment, the drive force transmitted to the development coupling 155 is transmitted to the conveyance screw 71 via a shaft 75, and the conveyance screw 71 is rotated.

In the longer direction of the process cartridge B, the development unit 15 has a drive end and a non-drive end opposite to the drive end. The development coupling 155 is arranged at the drive end, and the development contact point 16*b* and the development blade contact point 18*a* (refer to FIG. 8) are arranged at the non-drive end.

As illustrated in FIG. 22, the first reception port 21*c*, the seal member 153*c*, and the second reception port 153*a* are arranged on the drive end side relative to the center of the process cartridge B in the longer direction of the process cartridge B. That is, in the longer direction of the process cartridge B, the first reception port 21*c*, the seal member 153*c*, and the second reception port 153*a* are closer to the development coupling 155 than to the development contact point 16*b* and the development blade contact point 18*a*.

As illustrated in FIG. 22, a direction in which toner is supplied from the toner cartridge C to the stay 21 is a direction away from the development coupling 155. After the toner supplied to the stay 21 is conveyed in the direction away from the development coupling 155, the toner is conveyed to the development unit 15. Because the toner is conveyed in the direction away from the development coupling 155, the development coupling 155 is prevented from being soiled with toner. Because the first reception port 21*c*, the seal member 153*c*, and the second reception port 153*a* are arranged at positions distant from the development contact point 16*b* and the development blade contact point 18*a*, the development contact point 16*b* and the development blade contact point 18*a* are also prevented from being soiled with toner.

As illustrated in FIG. 7B, the first reception port 21*c* through which toner is received from the toner cartridge C is provided on the stay 21 of the photosensitive member unit 10. In the state in which the process cartridge B is attached to the printer main body A, the photosensitive member unit 10 is positionally fixed to the printer main body A. Thus, the position of the first reception port 21*c* does not change in both of the state in which the development unit 15 is arranged at the contact position and the state in which the development unit 15 is arranged at the separation position.

As illustrated in FIG. 20A, the periphery of the second reception port 153*a* of the toner reception unit 153 and the periphery of the stay discharge port 21*d* of the stay 21 each have a shape extending along an arc with a radius R3 that is centered on the pivotal axis line 8 of the development unit 15. Thus, a depression amount (compression amount) of the seal member 153*c* remains nearly unchanged in both of the state in which the development unit 15 is arranged at the contact position and the state in which the development unit 15 is arranged at the separation position. A stable sealing property can be ensured even while the development unit 15 moves between the separation position and the contact position. When the development unit 15 is arranged at the contact position and when the development unit 15 is arranged at the separation position, at least a part of the second reception port 153*a* can be communicated with the stay discharge port 21*d*. With this configuration, in both of the case where the development unit 15 is arranged at the separation position and the case where the development unit 15 is arranged at the contact position, the development unit 15 can receive toner from the toner cartridge C.

Toner Reception Unit

The toner reception unit 153 of the development unit 15 will be described with reference to FIGS. 20A, 20B, 23, and 24.

Figure 23:
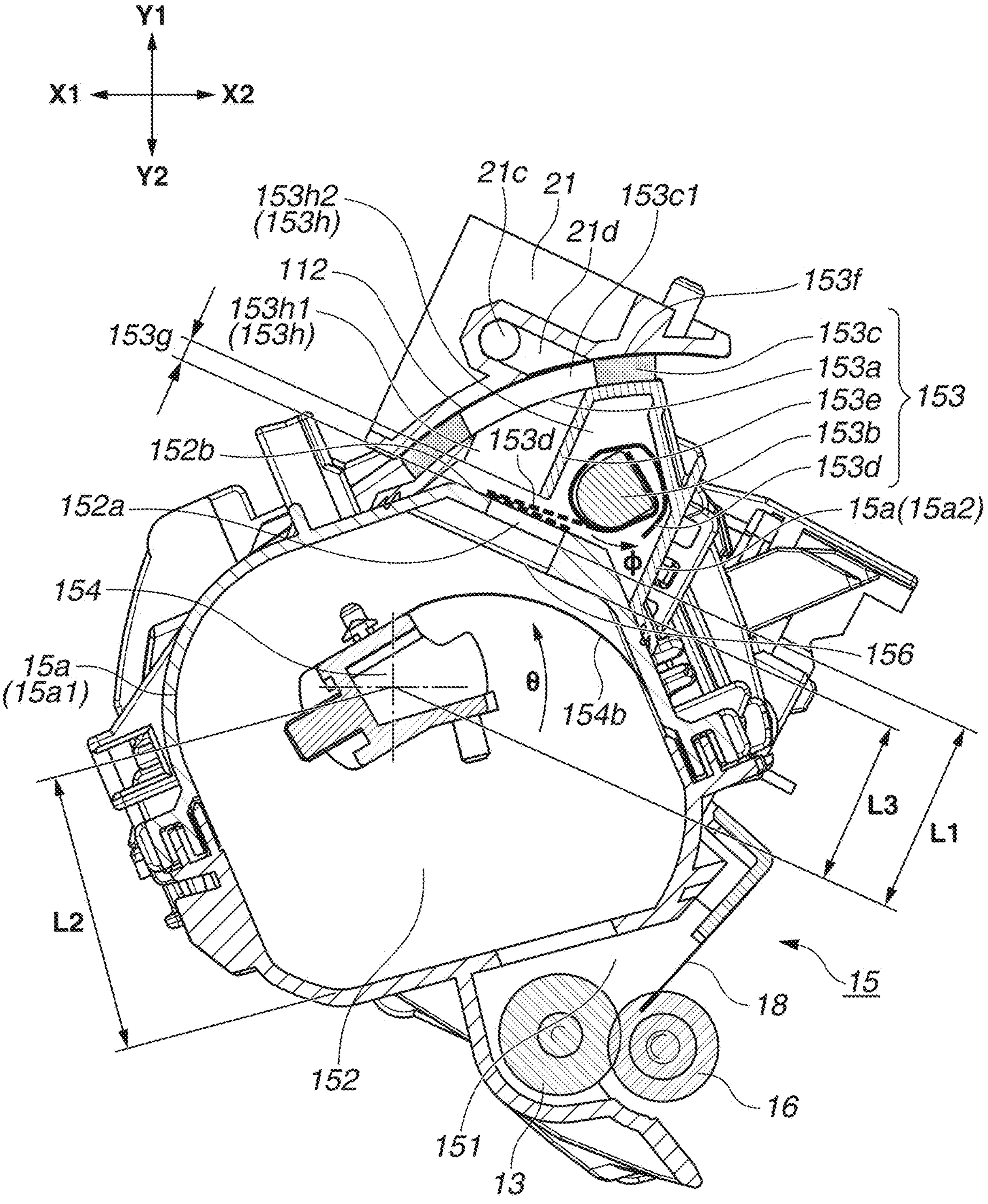
FIG. 23 is a cross-sectional view of the process cartridge.
Figure 24:
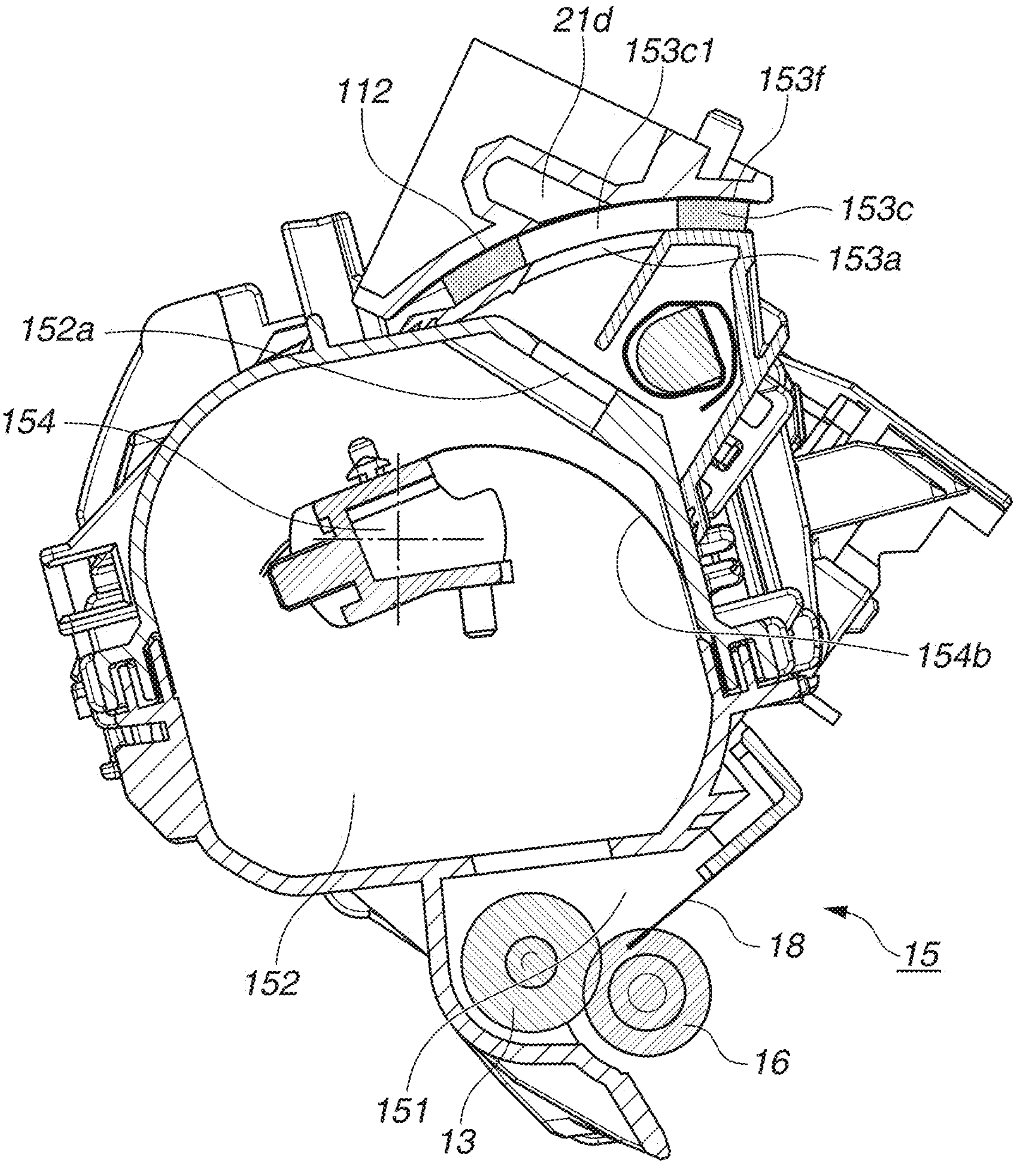
FIG. 24 is a cross-sectional view of the process cartridge.

FIGS. 23 and 24 are cross-sectional views of the process cartridge B, and illustrate the configuration of the toner reception unit 153 of the development unit 15. In FIG. 23, the development unit 15 is arranged at the contact position, and in FIG. 24, the development unit 15 is arranged at the separation position.

The seal member 153*c* has the seal opening 153*c*1 that communicates with the second reception port 153*a*. In addition, a facing surface 153*f* of the seal member 153*c* faces a sliding surface 112 of the photosensitive member unit 10.

As illustrated in FIG. 23, the stay 21 is provided with the sliding surface 112. On the other hand, the seal member 153*c* has the facing surface 153*f* that faces the sliding surface 112. The sliding surface 112 is in contact with the facing surface 153*f*. When the development unit 15 moves between the contact position and the separation position relative to the photosensitive member unit 10, the facing surface 153*f* slides on the sliding surface 112. In the state in which the process cartridge B is attached to the printer main body A, the facing surface 153*f* is located below the sliding surface 112.

In the present exemplary embodiment, as the material of the stay (relay frame) 21, impact-resistant polystyrene and polystyrene-polyphenylene ether alloy resins can be used. In the present exemplary embodiment, the sliding surface 112 constitutes a part of a sheet member serving as a surface formation member that is attached to the stay 21. The sliding surface 112 has an opening in such a manner as to overlap with the stay discharge port 21*d*, and toner discharged from the stay discharge port 21*d* can pass through the opening formed on the sliding surface 112.

The sliding surface 112 can be formed of polyphenylene sulfide (PPS), polyimide (PI), or polytetrafluoroethylene (PTFE). From the viewpoint of suppressing the sliding resistance of the sliding surface 112 and a work function to be described below, the PTFE is desirably used as the material of the sliding surface 112.

In the present exemplary embodiment, the material of the stay 21 and the material of the sliding surface 112 are different, but the material of the stay 21 and the material of the sliding surface 112 may be the same. The surface formation member having the sliding surface 112 is a sheet in the present exemplary embodiment but may be coating applied to at least a part of the stay 21.

In the present exemplary embodiment, the stay 21 and the sliding surface 112 are different components, but they may constitute one component. By providing the stay 21 and the sliding surface 112 as different components, a degree of design flexibility in selecting the material of the stay 21 and the material of the sliding surface 112 increases.

In this manner, the stay 21 includes the stay discharge port 21*d* (discharge port) through which toner is discharged, and has the sliding surface 112 arranged around the stay discharge port 21*d*. The opening of the sliding surface 112 also has a function as a discharge port through which toner is discharged. The sliding surface 112 can also be considered as a surface (discharge surface) on which a discharge port through which toner is discharged is formed.

As illustrated in FIGS. 20A and 20B, the sliding surface 112 is a curved surface, and more specifically, has a recessed shape. The sliding surface 112 has a shape recessed from the facing surface 153*f* toward the sliding surface 112. The development unit 15 can move relative to the photosensitive member unit 10 in such a manner that the facing surface 153*f* moves relative to the sliding surface 112 while being in contact with the sliding surface 112.

The seal member 153*c* can be deformed in such a manner that the facing surface 153*f* extends along the sliding surface 112.

The seal member 153*c* deforms in such a manner that the facing surface 153*f* curves in a projecting manner along the sliding surface 112. With this configuration, as compared with a configuration in which the facing surface 153*f* curves in a recessed manner, crinkling is less likely to be generated on the facing surface 153*f*.

More specifically, the sliding surface 112 is formed along the arc with the radius R3 that is centered on the pivotal axis line 8 of the development unit 15. Due to the development unit 15 pivoting around the pivotal axis line 8 with respect to the photosensitive member unit 10, the seal member 153*c* also moves along the arc with the radius R3. The facing surface 153*f* accordingly moves relative to the sliding surface 112 while being in contact with the sliding surface 112.

At this time, a state in which the seal member 153*c* is depressed by a certain depression amount (compression amount) is maintained. In other words, while the development unit 15 is moving between the contact position and the separation position, the state in which the seal member 153*c* is depressed by the certain depression amount is maintained.

The position of the development unit 15 with respect to the photosensitive member unit 10 sometimes varies due to the influence of dimension tolerance. Accordingly, in order to stably ensure a depression amount of the seal member 153*c*, it is desirable that an elastic material is used in a base layer of the seal member 153*c* and the seal member 153*c* is used with the base layer portion compressed by a predetermined amount. As the elastic material of the base layer, a foam, such as a urethane foam, can be used.

On the other hand, in order to keep a good sliding property with respect to the sliding surface 112, the facing surface 153*f*, which is a surface layer of the seal member 153*c*, is desirably formed of compound fiber of polyamide and polyester. As the polyamide, polyamide (nylon) having an aliphatic skeleton can be used.

For the purpose of imparting an appropriate property to toner, an external additive is applied onto toner base particles. The external additive is generally chargeable to the same polarity as toner.

Toner exists on the sliding surface 112 after the development unit 15 moves between the development position and the separation position (development and separation operation). The seal member 153*c* provides sealing in such a manner that toner does not leak to the outside of the process cartridge B. Nevertheless, if the number of times the development unit 15 moves between the development position and the separation position increases along with the enhancement of longevity of the process cartridge B, a small amount of toner sometimes enters between the sliding surface 112 and the facing surface 153*f*.

When an operation in which the development unit 15 moves between the development position and the separation position (development and separation operation) is performed, the toner having entered between the sliding surface 112 and the facing surface 153*f* receives electrostatic force attributed to an electric field generated by sliding friction between the sliding surface 112 and the facing surface 153*f*. In a case where the electrostatic force is directed toward the sliding surface 112, the deposition of toner on the sliding surface 112 is promoted. As a result, the toner agglomerates together between the sliding surface 112 and the facing surface 153*f*, and a depression amount of the seal member 153*c* sometimes becomes unstable.

Thus, in a case where the facing surface 153*f* moves along the sliding surface 112 in contact with the sliding surface 112 with toner existing between the facing surface 153*f* and the sliding surface 112, the toner and the sliding surface 112 are desirably charged to the same side polarity relative to the polarity of the facing surface 153*f*.

More specifically, in a case where a work function of the facing surface 153*f*, a work function of toner, and a work function of the sliding surface 112 are arranged in descending order, the work function of toner is desirably arranged between the work function of the facing surface 153*f* and the work function of the sliding surface 112.

In a case where a normal polarity of toner is a negative polarity, for example, toner and the sliding surface 112 are desirably charged to the negative polarity relative to the polarity of the facing surface 153*f*. In other words, in a case where the facing surface 153*f* moves along the sliding surface 112 in contact with the sliding surface 112, with toner existing between the facing surface 153*f* and the sliding surface 112, the toner and the sliding surface 112 are desirably charged to the negative polarity relative to the polarity of the facing surface 153*f*. In this case, it is desirable that the relationship of the work functions satisfies the work function of the facing surface 153*f*<the work function of toner<the work function of the sliding surface 112.

In the laser printer 1 according to the present exemplary embodiment, because negative-polarity bias is applied to the charging roller 12, the development roller 16, the development blade 18, and the supply roller 13, toner and the drum unit 11 are charged to the negative polarity. Thus, toner itself has negative chargeability. In other words, a normal polarity of toner in the present exemplary embodiment is the negative polarity.

Measuring Method of Work Function

Figure 25A:
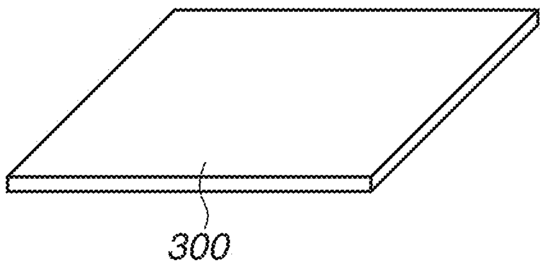
FIGS. 25A to 25C are schematic diagrams illustrating a measuring method of a work function.
Figure 25B:
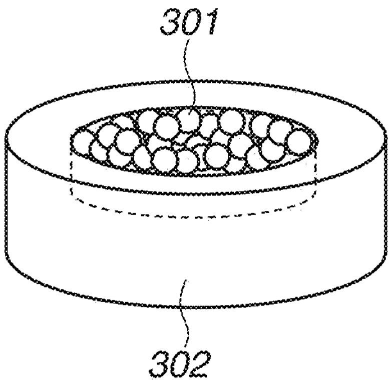
Figure 25C:
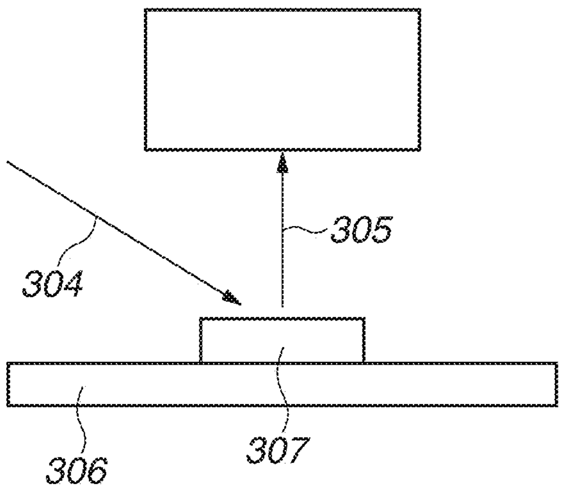

A measuring method of a work function (Φ) will be described with reference to FIGS. 25A, 25B, and 25C. FIGS. 25A, 25B, and 25C are schematic diagrams illustrating a measuring method of a work function. FIG. 25A is a schematic diagram of a sheet-like sample 300, FIG. 25B is a schematic diagram of powder sample, and FIG. 25C is a schematic diagram of a measuring device for a work function.

A work function (Φ) is known as photon energy required to positively charge a substance by releasing photoelectrons from the substance. The smaller the work function is, the more easily photoelectrons are released, and the larger the work function is, the less easily photoelectrons are released. Thus, a substance with a small work function has a property of being easily charged to the positive polarity, and a substance with a large work function has a property of being easily charged to the negative polarity.

The work function is measured using the following measuring method, for example, and is converted into a numerical value indicating energy [eV] for extracting photoelectrons from a substance.

In the present exemplary embodiment, the work function (Φ) is measured using a surface analysis device (AC-5 manufactured by Riken Keiki Co., Ltd., low-energy electron counting system). In this surface analysis device, an irradiation light amount is set to 800 nW using a deuterium lamp. As illustrated in FIG. 25C, monochromatic light selected by a spectroscope is used as measurement light 304. The measurement light 304 is emitted onto a measurement sample 307 with a spot size of 4 millimeters (mm)×4 mm in an energy scanning range of 3.4 to 6.2 [eV] for a measurement time of 10 sec/1 point. Then, by calculating a detection result of a photoelectron 305 released from the surface of the measurement sample 307, the work function (Φ) can be obtained. Software accompanying the surface analysis device can be used for the calculation. In the present exemplary embodiment, the work function is measured based on a repetitive accuracy (standard deviation) of 0.02 [eV].

To ensure data reproducibility, it is desirable to use a sample left for 24 hours under the condition of operating temperature of 25° C. and operating humidity of 55% RH, as a measurement sample. When a work function of a sheet-like sample is to be measured, the rectangular sheet-like sample 300 as illustrated in FIG. 25A is fixed to a stage 306 and used as the measurement sample 307. Because the measurement light 304 is emitted to the spot of 4 mm×4 mm, the sheet-like sample 300 desirably has a size of at least 1 centimeter (cm)×1 cm.

On the other hand, to measure a work function of a powder sample like toner 301, a cell 302 as illustrated in FIG. 25B is used. The cell 302 is a container in which a recessed portion with a diameter of 15 mm and a depth of 3 mm is provided at the center of a stainless-steel disk with a diameter of 30 mm and a height of 5 mm. After the toner 301 is injected into the recessed portion, with the surface of the toner 301 kept flattened, the cell 302 is placed on the stage 306 as the measurement sample 307 and measurement is performed.

In a case where work functions of the facing surface 153*f*, toner, and the sliding surface 112 are arranged in descending order, the relationship of the functions satisfies the work function of the facing surface 153*f*<the work function of toner<the work function of the sliding surface 112. That is, the facing surface 153*f* is most likely to be charged to the positive polarity, and the sliding surface 112 is most likely to be charged to the negative polarity.

Sealing of Toner that is Based on Magnitude Relationship of Work Functions

In the present exemplary embodiment, in accordance with the development and separation operation of the development unit 15, the sliding surface 112 and toner are frictionally charged to the negative polarity relative to the polarity of the facing surface 153*f*. The toner accordingly receives repulsive force (negative electrostatic force) from the sliding surface 112 charged to the negative polarity, and are separated from the sliding surface 112. The toner charged to the negative polarity receives electrostatic force in a direction away from the sliding surface 112 within an electric field formed by the facing surface 153*f* charged to the positive polarity and the sliding surface 112 charged to the negative polarity. Thus, toner that has entered between the sliding surface 112 and the facing surface 153f by the development and separation operation is prevented from being deposited on the sliding surface 112, and a toner is prevented from being formed into an agglomeration between the sliding surface 112 and the facing surface 153f.

As a result, even in a case where the number of development separation operations is large, it becomes possible to stably ensure a sealing property against toner between the sliding surface 112 and the seal member 153c.

In the present exemplary embodiment, the relationship of the work functions satisfies the work function of the facing surface 153f<the work function of toner<the work function of the sliding surface 112. Nevertheless, even in a case where the relationship of the work functions only satisfies the work function of toner>the work function of the sliding surface 112, it is possible to stably ensure a sealing property against toner between the sliding surface 112 and the seal member 153c. This is because force separating toner and the sliding surface 112 from each other is generated between toner and the sliding surface 112 if the sliding surface 112 is charged to the negative polarity because a normal polarity of toner is the negative polarity. Nevertheless, from the viewpoint of further reduction of toner adhesion to the sliding surface 112, it is more desirable to charge the facing surface 153f to the positive polarity relative to the polarity of toner. That is, it is more desirable that the relationship of the work functions satisfies the work function of the facing surface 153f<the work function of toner<the work function of the sliding surface 112.

On the other hand, in a case where a normal polarity of toner is a positive polarity, it is desirable to charge toner and the sliding surface 112 to the positive polarity relative to the polarity of the facing surface 153f. In other words, in a case where the facing surface 153f moves along the sliding surface 112 in contact with the sliding surface 112, with toner existing between the facing surface 153f and the sliding surface 112, it is desirable to charge toner and the sliding surface 112 to the positive polarity relative to the polarity of the facing surface 153f. In this case, it is desirable that the relationship of the work functions satisfies the work function of the facing surface 153f>the work function of toner>the work function of the sliding surface 112.

As described above, based on the charging polarity relationship of the sliding surface 112, the facing surface 153f, and toner, it is possible to prevent toner from being deposited on the sliding surface 112. It is accordingly possible to prevent toner from leaking from the process cartridge B.

As illustrated in FIGS. 23 and 24, in the state in which the process cartridge B is attached to the printer main body A, the sliding surface 112 is oriented downward. Accordingly, toner is easily detached from the sliding surface 112. Furthermore, when the development unit 15 is arranged at the contact position and when the development unit 15 is arranged at the separation position, the seal opening 153c1 overlaps with the sliding surface 112. In other words, a part of the sliding surface 112 is exposed downward from the seal opening 153c1. The toner detached from the sliding surface 112 can accordingly enter the second reception port 153a through the seal opening 153c1.

Internal Structure of Toner Reception Unit

An internal structure of the toner reception unit 153 will be described in more detail with reference to FIG. 23. As illustrated in FIG. 23, the toner reception unit 153 is provided with the shaft member (movement member, rotation member) 153b. The shaft member 153b is arranged on the outside of the developer storage unit 152, and rotatably supported in the toner reception unit 153. A sealing sheet 153d having flexibility is connected to the shaft member 153b. The sealing sheet 153d is a seal member having a sheet shape.

The sealing sheet 153d is attached to the first frame 15a1 in such a manner as to cover the development reception port 152a. More specifically, as indicated by dotted lines in FIG. 23, when the process cartridge B is not used, the sealing sheet 153d is welded to a welding bearing surface 152b provided around the development reception port 152a, in a folded-back state. Thus, the sealing sheet 153d seals the development reception port 152a when the process cartridge B is not used, and prevents toner from flowing back from the development reception port 152a to the toner reception unit 153 while the process cartridge B is being carried.

A partition wall 153e is provided between the second reception port 153a and the shaft member 153b. The partition wall 153e divides the toner pathway 153h1 and the shaft member 153b from each other.

A seal chamber 153h2 accommodating the shaft member 153b, and the toner pathway 153h1 are provided in the toner reception unit 153. In other words, the development frame 15a includes an intermediate chamber (relay chamber) 153h including the toner pathway 153h1 and the seal chamber 153h2.

The partition wall 153e partitions the intermediate chamber 153h into the toner pathway 153h1 and the seal chamber 153h2. A clearance gap 153g is formed between an internal wall of the intermediate chamber 153h and the leading end of the partition wall 153e in such a manner that the toner pathway 153h1 and the seal chamber 153h2 are communicated with each other.

More specifically, one end of the partition wall 153e extends toward the development reception port 152a, and the other end of the partition wall 153e is integrally formed with an internal wall of the second development frame 15a2 including the second reception port 153a. As illustrated in FIG. 23, the clearance gap 153g is closer to the development reception port 152a than to the second reception port 153a. In other words, a distance between the clearance gap 153g and the second reception port 153a is greater than a distance between the clearance gap 153g and the development reception port 152a.

The clearance gap 153g is formed between the one end of the partition wall 153e and the welding bearing surface 152b. In the present exemplary embodiment, the second reception port 153a and the development reception port 152a are arranged approximately along a Y2 direction (refer to FIG. 1), and the partition wall 153e is provided approximately parallel to a direction in which toner flows from the second reception port 153a toward the development reception port 152a. In the present exemplary embodiment, the length of the clearance gap 153g is 2 mm. In a state in which the sealing sheet 153d covers the development reception port 152a and seals the development reception port 152a, a part of the sealing sheet 153d exists in the clearance gap 153g.

The shaft member 153b can move the sealing sheet 153d in such a manner as to expose the development reception port 152a. More specifically, when the process cartridge B is used, the process cartridge B is driven by the printer main body A. At this time, the development coupling 155 of the development unit 15 of the process cartridge B receives a drive force from the printer main body A, and the shaft member 153b rotates in an arrow φ direction. When the shaft member 153b rotates in the arrow φ direction, the shaft member 153*b* rolls up the sealing sheet 153*d*. The sealing sheet 153*d* is accordingly peeled off from the welding bearing surface 152*b*. Consequently, the development reception port 152*a* is exposed.

After the sealing sheet 153*d* is moved in such a manner that the development reception port 152*a* is exposed, during an image formation operation, the shaft member 153*b* is driven together with the development roller 16. When the shaft member 153*b* is driven, the sealing sheet 153*d* comes into contact with the partition wall 153*e*. Due to the sealing sheet 153*d* coming into contact with the partition wall 153*e*, the sealing sheet 153*d* is prevented from entering the toner pathway 153*h*1.

More specifically, because the sealing sheet 153*d* has flexibility, during the rotation of the shaft member 153*b*, the sealing sheet 153*d* winds around the shaft member 153*b* and enters a warped state by coming into contact with the partition wall 153*e* and the internal wall of the toner reception unit 153. In this state, while the process cartridge B is driven, the shaft member 153*b* continues to rotate in the arrow φ direction.

When the sealing sheet 153*d* is peeled off from the welding bearing surface 152*b*, the sealing sheet 153*d* is winded up by the shaft member 153*b* through the clearance gap 153*g*. In a state in which the sealing sheet 153*d* is moving in contact with the one end of the partition wall 153*e*, the sealing sheet 153*d* may be winded up by the shaft member 153*b*. To reduce the load on the shaft member 153*b* to wind up the sealing sheet 153*d*, a direction in which the shaft member 153*b* pulls the sealing sheet 153*d* may be changed by the partition wall 153*e*.

Even in a case where the shaft member 153*b* continues to rotate in the arrow φ direction after the sealing sheet 153*d* is winded up by the shaft member 153*b*, the sealing sheet 153*d* comes into contact with the partition wall 153*e*. The state in which the sealing sheet 153*d* winds around the shaft member 153*b* is thereby maintained. This prevents the sealing sheet 153*d* from agitating toner and prevents toner from scattering in the toner reception unit 153 and flowing back from the second reception port 153*a*. Accordingly, toner leakage from the second reception port 153*a* that is caused by the rotation of the shaft member 153*b* is prevented.

Due to the partition wall 153*e* dividing the second reception port 153*a* and the shaft member 153*b* from each other, toner is prevented from flowing to the periphery of the shaft member 153*b*. Thus, toner flowing from the second reception port 153*a* to the development reception port 152*a* is prevented from being retained in the seal chamber 153*h*2.

The shaft member 153*b* may include a conveyance portion that conveys toner, and may be configured to convey toner from the clearance gap 153*g* to the toner pathway 153*h*1. With this configuration, even if toner flowing from the second reception port 153*a* toward the development reception port 152*a* flows to the periphery of the shaft member 153*b* through the clearance gap 153*g*, the toner can be conveyed by the shaft member 153*b* to the development reception port 152*a*.

With the above-described configuration, it is possible to prevent toner from leaking from the process cartridge B.

Agitation Member

The agitation member 154 will be described in more detail with reference to FIGS. 23, 26, 27A, and 27B.

Figure 26:
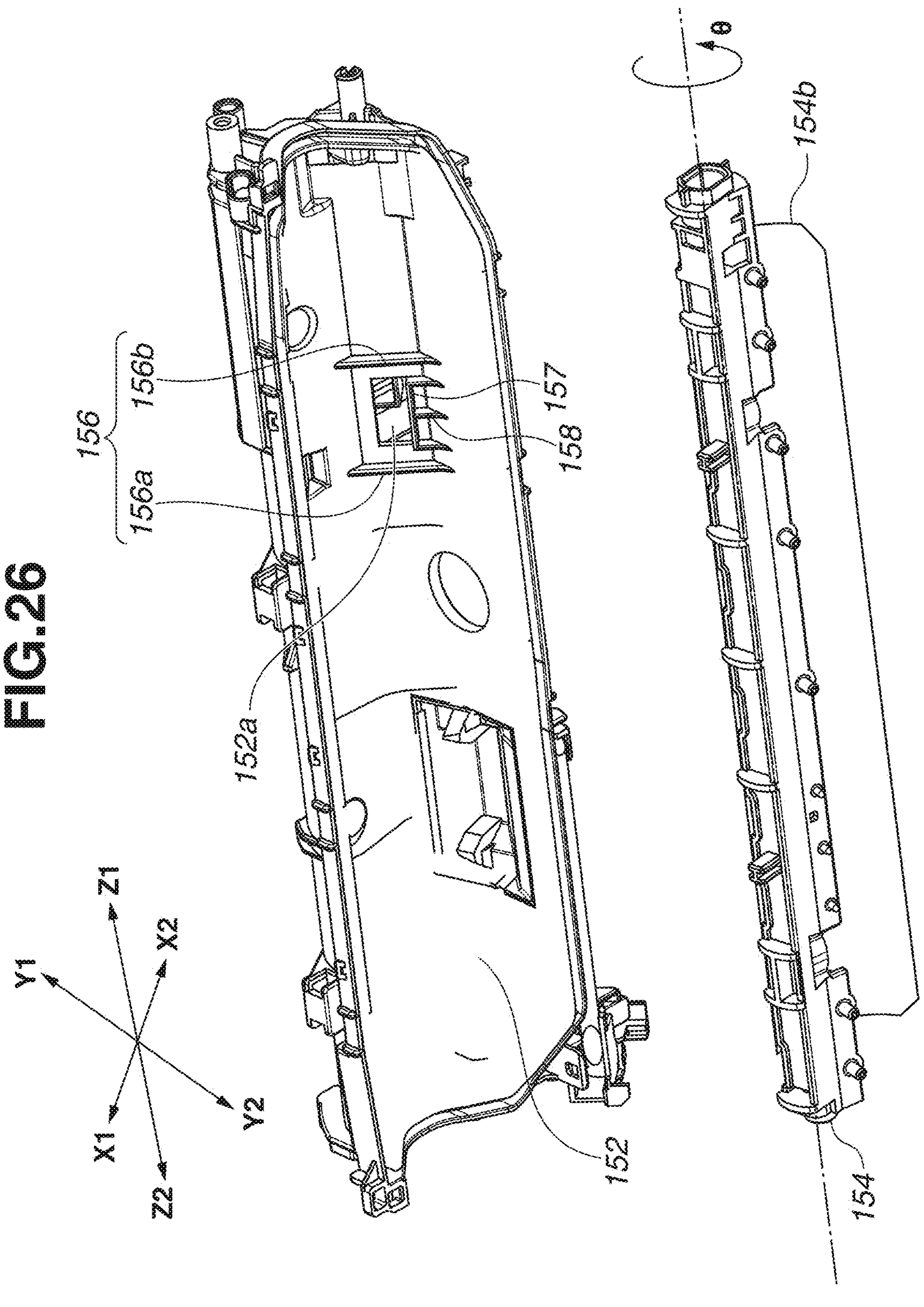
FIG. 26 is an exploded view illustrating an internal structure of a development unit.
Figure 27A:
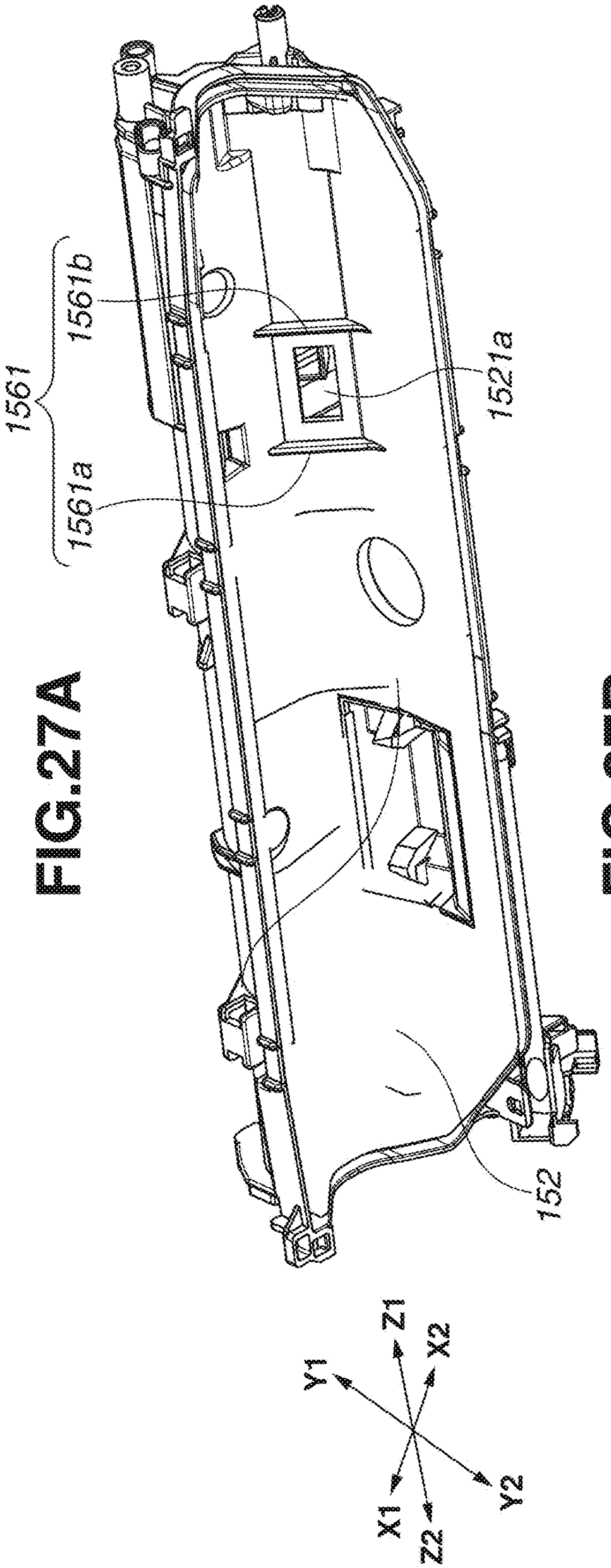
FIGS. 27A and 27B are exploded views illustrating an internal structure of a development unit according to a modified example.
Figure 27B:
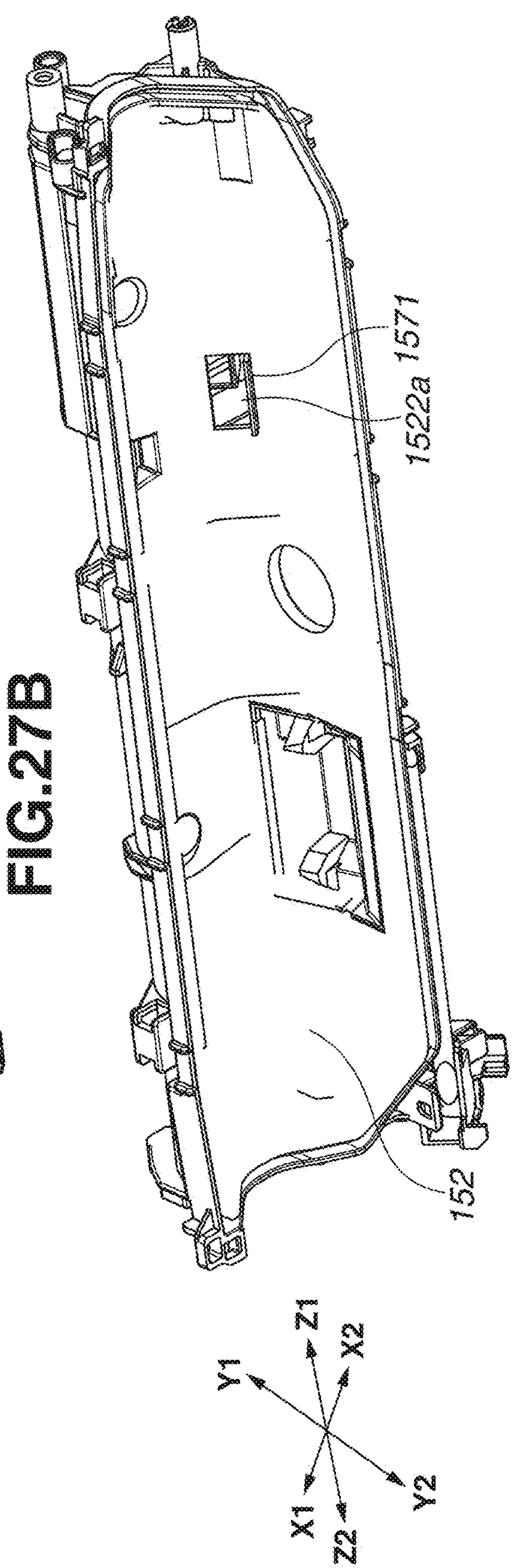

FIG. 26 is a perspective view illustrating an internal structure of the development unit 15, and illustrates a configuration for preventing a toner back-flow to the development reception port 152*a*. FIGS. 27A and 27B are perspective views illustrating an internal structure of the development unit 15 according to a modified example, and illustrate a configuration for preventing a toner back-flow to the development reception port 152*a*. In FIGS. 26, 27A, and 27B, the illustration of the development chamber 151 is omitted.

As illustrated in FIG. 23, the agitation member 154 includes an agitation sheet 154*b* for agitating and conveying toner in the developer storage unit 152. The agitation sheet 154*b* has flexibility, and polyethylene terephthalate (PET) or polycarbonate (PC) is desirably used as the material of the agitation sheet 154*b*.

A length of the agitation sheet 154*b* in a direction orthogonal to the Z direction is greater than a first linear distance L1 from the rotational center of the agitation member 154 to the development reception port 152*a* and a second linear distance L2 from the rotational center of the agitation member 154 to the development chamber 151. Thus, in accordance with the rotation of the agitation member 154 in the arrow θ direction, the agitation sheet 154*b* conveys toner in a warped state while being in contact with the internal wall of the developer storage unit 152.

The toner agitated by the agitation sheet 154*b* is conveyed to the development chamber 151. Some of toner circulating in the development chamber 151 by the rotation of the development roller 16 and the supply roller 13 is returned into the developer storage unit 152, and agitated by the agitation sheet 154*b*.

Because the toner in the development chamber 151 is rubbed by the development roller 16, the supply roller 13, and the development blade 18, and receives the weight of toner in the developer storage unit 152, the toner in the development chamber 151 receives pressure higher than the toner in the developer storage unit 152. Thus, by returning the toner in the development chamber 151 again into the developer storage unit 152, it is possible to prevent intensive deterioration of toner from occurring partially in the toner.

To promote toner in the development chamber 151 to circulate into the developer storage unit 152, it is desirable to ensure a sufficient clearance gap between the agitation member 154 and the development chamber 151, and ensure a flow path on which toner returns. That is, it is desirable to provide the second linear distance L2 adequately, but if the second linear distance L2 is increased within the space of the developer storage unit 152, the first linear distance L1 becomes shorter. If the first linear distance L1 becomes shorter, the bend stress of the agitation sheet 154*b* increases in accordance with an increase in a warp amount of the agitation sheet 154*b*.

In the present exemplary embodiment, to secure toner circulation in the development unit 15 and to reduce the bend stress of the agitation sheet 154*b*, the first linear distance L1 and the second linear distance L2 are set to 18 mm (L1=18 mm) and 25 mm (L2=25 mm), respectively, and a free length of the agitation sheet 154*b* is set to 32 mm.

As illustrated in FIGS. 23 and 26, the developer storage unit 152 is provided with a projection portion 156 to prevent toner from flowing back to the second reception port 153*a* by a rotational movement of the agitation sheet 154*b*. The projection portion 156 is a rib projection extending in a direction approximately vertical to a straight line drawn from the rotational center of the agitation member 154 to the development reception port 152*a*, and arranged between the rotational center of the agitation member 154 and the development reception port 152*a*.

That is, a third linear distance L3 from the rotational center of the agitation member 154 to the projection portion 156 is shorter than the first linear distance L1. In the present exemplary embodiment, the third linear distance L3 is set to 15 mm (L3=15 mm). The projection portions 156 are arranged on the outer sides of the development reception port 152*a* in the longer direction. That is, the projection portions 156 are arranged on both sides of the development reception port 152*a* in the arrow Z1 direction and the arrow Z2 direction, which corresponds to the rotational axis direction of the agitation member 154, as one end side projection portion 156*a* and another end side projection portion 156*b*. Either one of the one end side projection portion 156*a* and the other end side projection portion 156*b* may be provided, but both are desirably provided to keep the warp amount of the agitation sheet 154*b* constant in the arrow Z1 (Z2) direction.

In accordance with the rotation in the arrow θ direction, the agitation sheet 154*b* comes into contact with the projection portions 156 provided on the upstream side of the development reception port 152*a* in the rotational direction. Because the projection portions 156 are formed in such a manner as to satisfy L3<L1, the agitation sheet 154*b* conveys toner without being in direct contact with the development reception port 152*a*. By the agitation sheet 154*b* coming into contact with the projection portions 156, toner is prevented from being conveyed to flow back toward the development reception port 152*a*. For this reason, it is possible to prevent toner leakage from the toner reception unit 153. Whereas the projection portions 156 can also be arranged at positions distant from the development reception port 152*a*, the projection portions 156 may be arranged at positions near the development reception port 152*a*.

As illustrated in FIG. 26, the developer storage unit 152 is provided with a projection portion 157. Due to the projection portion 157, toner is prevented from flowing back to the second reception port 153*a* by a rotational movement of the agitation sheet 154*b*.

The projection portion 157 is a rib projection extending in the longer direction, which corresponds to the rotational axis direction of the agitation member 154 (i.e., arrow Z1 and Z2 directions), and is arranged between the rotational center of the agitation member 154 and the development reception port 152*a*. At least a part of the projection portion 157 is provided to overlap the development reception port 152*a* in the longer direction.

In the present exemplary embodiment, the projection portion 157 is provided at the same height as the projection portions 156, and a length of a straight line drawn from the rotational center of the agitation member 154 to the projection portion 157 is the same as the third linear distance L3.

The projection portion 157 is provided on the upstream side of the development reception port 152*a* in the rotational direction of the agitation sheet 154*b*. In accordance with the rotation in the arrow θ direction, the agitation sheet 154*b* comes into contact with the projection portion 157 arranged near the development reception port 152*a*. Because the projection portion 157 is formed in such a manner as to satisfy L3<L1, toner deposited on the agitation sheet 154*b* is scraped off by the projection portion 157. The toner deposited on the agitation sheet 154*b* is accordingly prevented from coming into direct contact with the development reception port 152*a*.

The toner scraped off by the projection portion 157 drops in the arrow Y2 direction (refer to FIG. 1) due to gravitational force. The projection portion 157 prevents toner conveyed by the agitation sheet 154*b* from flowing back from the development reception port 152*a*. Toner leakage from the toner reception unit 153 is accordingly prevented.

In the present exemplary embodiment, reinforcement ribs 158 serving as a support portion for reinforcing the projection portion 157 are provided on the upstream side of the projection portion 157 in the rotational direction of the agitation member 154. Although the above-described effect of preventing a toner back-flow can be obtained without providing the reinforcement ribs 158, the reinforcement ribs 158 are desirably provided to reinforce the projection portion 157.

In the present exemplary embodiment, as illustrated in FIG. 26, both the projection portions 156 and the projection portion 157 are provided. Nevertheless, as illustrated in FIG. 27A, only projection portions 1561 (1561*a*, 1561*b*) may be provided on both ends of a development reception port 1521*a* in the longer direction. As illustrated in FIG. 27B, only a projection portion 1571 may be arranged on the upstream side of a development reception port 1522*a* in the rotational direction of the agitation member 154.

Figure 28A:
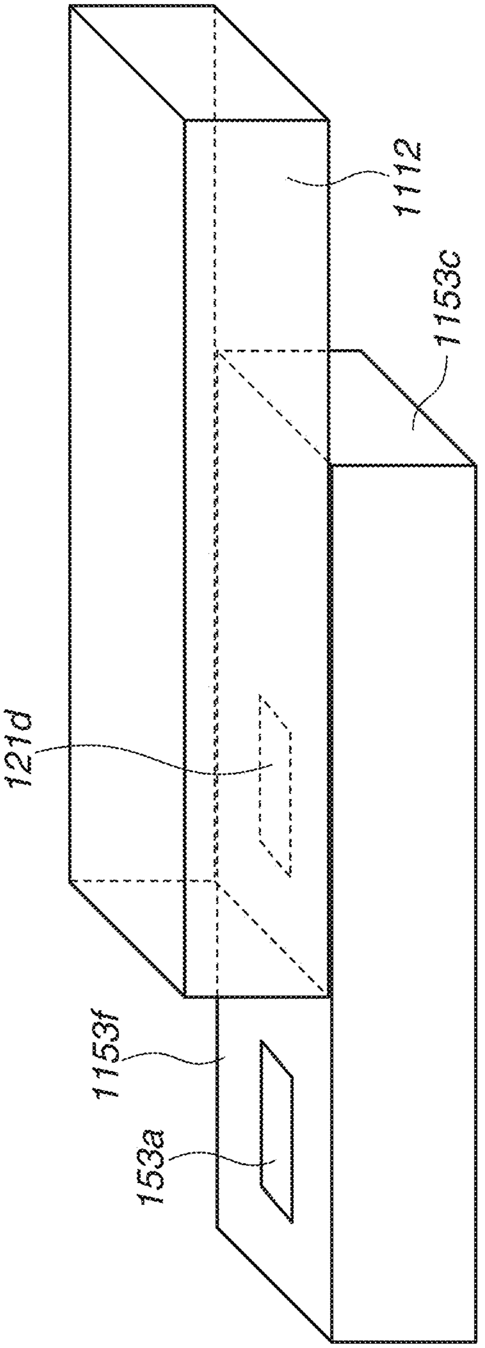
FIGS. 28A and 28B are diagrams illustrating a relationship between a discharge port and a seal member according to a second exemplary embodiment.
Figure 28B:
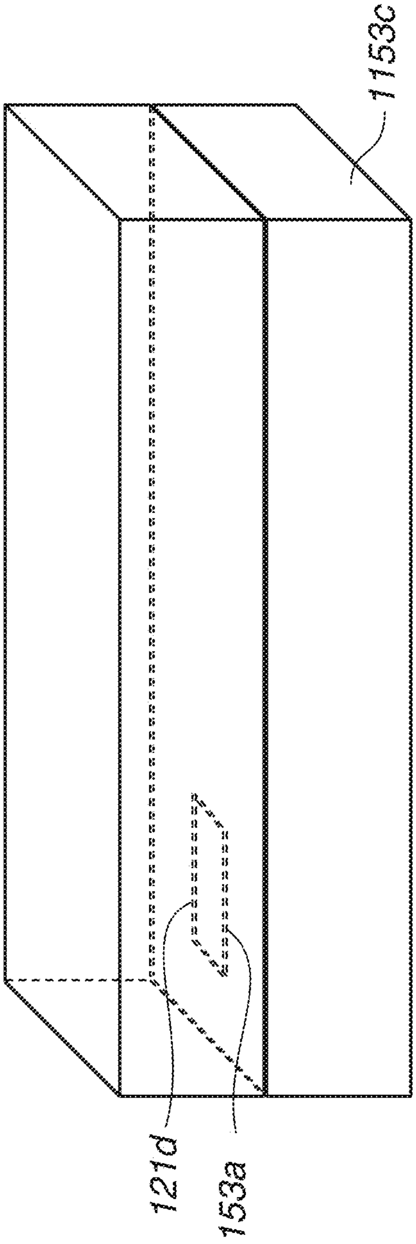

A second exemplary embodiment will be described with reference to FIGS. 28A and 28B. FIGS. 28A and 28B are diagrams illustrating a discharge port 121*d* and a seal member 1153*c* according to the second exemplary embodiment.

A process cartridge according to the second exemplary embodiment includes a sliding surface 1112 on which the discharge port 121*d* is formed, and the seal member 1153*c* having a facing surface 1153*f* facing the sliding surface 1112. The discharge port 121*d* corresponds to the stay discharge port 21*d* in the first exemplary embodiment, the sliding surface 1112 corresponds to the sliding surface 112 in the first exemplary embodiment, and the facing surface 1153*f* corresponds to the facing surface 153*f* in the first exemplary embodiment. Because their functions are similar to those described in the first exemplary embodiment, the detailed description will be omitted.

In the first exemplary embodiment, the facing surface 153*f* of the seal member 153*c* is moved along the sliding surface 112 having an arc shape. Nevertheless, for example, as illustrated in FIGS. 28A and 28B, the sliding surface 1112 may be planar, and the seal member 1153*c* may directly moves along the sliding surface 1112. Even with such a configuration, by setting the charging polarity relationship of the sliding surface 1112, the facing surface 1153*f*, and toner to the relationship described in the first exemplary embodiment, it is possible to prevent toner from being deposited between the sliding surface 1112 and the facing surface 1153*f*.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-177180, filed Oct. 13, 2023, which is hereby incorporated by reference herein in its entirety.

What is claimed is:

1. A process unit comprising:

a supply unit including a discharge port through which toner is discharged and having a discharge surface arranged around the discharge port; and a reception unit configured to receive toner from the supply unit, the reception unit including:

(i) a reception frame including a reception port through which toner discharged from the discharge port is received; and (ii) a reception seal member having a reception seal opening that communicates with the reception port, and a facing surface facing the discharge surface, wherein the reception unit is movable relative to the supply unit in such a manner that the facing surface moves relative to the discharge surface while being in contact with the discharge surface, and wherein, in a case where the facing surface moves relative to the discharge surface while being in contact with the discharge surface in a state in which the toner exists between the facing surface and the discharge surface, the toner and the discharge surface are charged to a same side polarity relative to a polarity of the facing surface.

2. The process unit according to claim 1, wherein the supply unit includes a photosensitive drum, and wherein the reception unit includes:

a development roller configured to develop an electrostatic latent image formed on the photosensitive drum; and the reception frame including (i) a storage chamber storing toner to be supplied to the development roller, and (ii) the reception port.

3. The process unit according to claim 1, wherein, in a case where a work function of the facing surface, a work function of the toner, and a work function of the discharge surface are arranged in descending order, the work function of the toner is arranged between the work function of the facing surface and the work function of the discharge surface.

4. The process unit according to claim 1, wherein, in a case where the facing surface moves relative to the discharge surface while being in contact with the discharge surface in a state in which the toner exists between the facing surface and the discharge surface, the toner and the discharge surface are charged to a negative polarity relative to the polarity of the facing surface.

5. The process unit according to claim 1, wherein the discharge surface is formed of polyphenylene sulfide, polyimide, or polytetrafluoroethylene.

6. The process unit according to claim 1, wherein the facing surface is formed of compound fiber of polyamide and polyester.

7. The process unit according to claim 1, wherein, in a case where the facing surface moves relative to the discharge surface while being in contact with the discharge surface in a state in which the toner exists between the facing surface and the discharge surface, the toner and the discharge surface are charged to a positive polarity relative to the polarity of the facing surface.

8. The process unit according to claim 1, wherein the discharge surface is a curved surface, and the reception seal member is deformed in such a manner that the facing surface follows the curved surface.

9. The process unit according to claim 1, wherein the supply unit includes a supply frame including the discharge port, and a surface formation member having the discharge surface and attached to the supply frame, and a material of the supply frame and a material of the surface formation member are different.

10. The process unit according to claim 1, wherein the process unit is attachable to and detachable from an apparatus main body of an image forming apparatus, and wherein the discharge surface is oriented downward in a state in which the process unit is attached to the apparatus main body.

11. A reception unit configured to receive toner from a supply unit, the supply unit including a discharge port through which toner is discharged and having a discharge surface arranged around the discharge port, the reception unit comprising:

a reception frame including a reception port through which toner discharged from the discharge port is received; and a reception seal member having a reception seal opening that communicates with the reception port, and a facing surface facing the discharge surface, wherein the reception unit is movable relative to the supply unit in such a manner that the facing surface moves relative to the discharge surface while being in contact with the discharge surface, and wherein, in a case where the facing surface moves relative to the discharge surface while being in contact with the discharge surface in a state in which the toner exists between the facing surface and the discharge surface, the toner and the discharge surface are charged to a same side polarity relative to a polarity of the facing surface.

12. The reception unit according to claim 11, further comprising:

a development roller configured to develop an electrostatic latent image formed on a photosensitive drum; and a development frame including (i) a storage chamber storing toner to be supplied to the development roller, and (ii) the reception port.

13. The reception unit according to claim 11, wherein, in a case where a work function of the facing surface, a work function of the toner, and a work function of the discharge surface are arranged in descending order, the work function of the toner is arranged between the work function of the facing surface and the work function of the discharge surface.

14. The reception unit according to claim 11, wherein, in a case where the facing surface moves relative to the discharge surface while being in contact with the discharge surface in a state in which the toner exists between the facing surface and the discharge surface, the toner and the discharge surface are charged to a negative polarity relative to the polarity of the facing surface.

15. The reception unit according to claim 11, wherein the discharge surface is formed of polyphenylene sulfide, polyimide, or polytetrafluoroethylene, and the facing surface is formed of compound fiber of polyamide and polyester.

16. The reception unit according to claim 11, wherein, in a case where the facing surface moves relative to the discharge surface while being in contact with the discharge surface in a state in which the toner exists between the facing surface and the discharge surface, the toner and the discharge surface are charged to a positive polarity relative to the polarity of the facing surface.

17. The reception unit according to claim 11, wherein the discharge surface is a curved surface, and the reception seal member is deformed in such a manner that the facing surface follows the curved surface.

18. The reception unit according to claim 11, wherein the reception unit is attachable to and detachable from an apparatus main body of an image forming apparatus, and wherein the discharge surface is oriented downward in a state in which the reception unit is attached to the apparatus main body.

* * * * *